US009364117B2

(12) United States Patent
Prefontaine

(10) Patent No.: US 9,364,117 B2
(45) Date of Patent: Jun. 14, 2016

(54) METHOD FOR REGULATING FLOW RATE IN AN ESPRESSO MACHINE

(71) Applicant: Seattle Espresso Machine Corporation, Seattle, WA (US)

(72) Inventor: Jason Camille Prefontaine, Seattle, WA (US)

(73) Assignee: Seattle Espresso Machine Corporation, Seattle, WA (US)

( * ) Notice: Subject to any disclaimer, the term of this patent is extended or adjusted under 35 U.S.C. 154(b) by 0 days.

(21) Appl. No.: 14/580,665

(22) Filed: Dec. 23, 2014

(65) Prior Publication Data

US 2015/0110935 A1 Apr. 23, 2015

Related U.S. Application Data

(63) Continuation-in-part of application No. 14/015,823, filed on Aug. 30, 2013.

(51) Int. Cl.
*A23F 5/26* (2006.01)
*A47J 31/46* (2006.01)
*A23F 3/18* (2006.01)

(52) U.S. Cl.
CPC . *A47J 31/46* (2013.01); *A23F 3/18* (2013.01); *A23F 5/26* (2013.01); *A23F 5/262* (2013.01)

(58) Field of Classification Search
CPC .............. A23F 5/26; A23F 5/262; A23F 3/18
See application file for complete search history.

(56) References Cited

U.S. PATENT DOCUMENTS

| 4,922,809 | A | 5/1990 | Fuhner | |
|---|---|---|---|---|
| 6,224,755 | B1 * | 5/2001 | Schamberg et al. | 210/149 |
| 2003/0003208 | A1 | 1/2003 | Lassota | |
| 2005/0056153 | A1 * | 3/2005 | Nottingham et al. | 99/279 |
| 2005/0274738 | A1 | 12/2005 | Tomsic et al. | |
| 2007/0113900 | A1 | 5/2007 | Greene et al. | |
| 2007/0175334 | A1 * | 8/2007 | Halliday et al. | 99/279 |
| 2008/0017041 | A1 | 1/2008 | Beretta | |
| 2008/0050480 | A1 * | 2/2008 | Doglioni Majer | 426/231 |
| 2010/0224075 | A1 | 9/2010 | Anliker | |
| 2011/0094390 | A1 | 4/2011 | Bianchi et al. | |

(Continued)

OTHER PUBLICATIONS

Slayer User Guide, Jun. 30, 2010, pp. 1-36.
Slayer User Guide, 2011 Edition, pp. 1-60.

*Primary Examiner* — Anthony Weier
(74) *Attorney, Agent, or Firm* — Jeffrey D. Patterson; Mark P. Walters; Lowe Graham Jones PLLC

(57) ABSTRACT

Embodiments are directed towards regulating flow rate in an espresso machine, during a multi-phase brewing process which includes a pre-brew and an extraction phase. During the pre-brew phase, coffee grounds are slowly pre-wetted and/or out-gassed with a first volume of water delivered at a first flow rate. During the extraction phase, a second volume of water is delivered, at a second flow rate, to extract espresso, where the second volume is delivered at a generally greater pressure than the first volume. The second flow rate is greater than the first flow rate. The flow rates, volumes, and pressures are regulated by the espresso machine, which includes a flow rate regulation assembly that includes first and second flow paths and first and second valves. Baristas may vary the flow rate, volume, and pressure of water throughout the brewing process by opening, closing, or otherwise adjusting at least one of the valves.

10 Claims, 10 Drawing Sheets

(56) References Cited

U.S. PATENT DOCUMENTS

| | | | |
|---|---|---|---|
| 2011/0300276 A1* | 12/2011 | Ozanne | 426/435 |
| 2012/0269944 A1 | 10/2012 | Bianchi et al. | |
| 2012/0301581 A1* | 11/2012 | Abegglen et al. | 426/112 |
| 2013/0068012 A1 | 3/2013 | Preston | |
| 2014/0123859 A1* | 5/2014 | Verbeek | 99/295 |

* cited by examiner

METHOD FOR REGULATING FLOW RATE IN AN ESPRESSO MACHINE

PRIORITY CLAIM

This patent application is a Continuation-in-Part of U.S. application Ser. No. 14/015823 entitled SYSTEM, METHOD, AND APPARATUS FOR REGULATING FLOW RATE IN AN ESPRESSO MACHINE, filed on Aug. 30, 2013, the contents of which are hereby incorporated by reference.

FIELD OF THE INVENTION

The present invention relates generally to regulating a flow rate, and more particularly, but not exclusively, to regulating a variable flow rate of pressurized water in a pump driven espresso machine, during an espresso brewing process.

BACKGROUND OF THE INVENTION

Espresso is a concentrated coffee beverage brewed by forcing heated pressurized water through ground coffee beans. By forcing heated pressurized water through ground coffee beans, the beverage produced during an espresso brewing process absorbs more of the flavor producing components, such as the oils and various solids found in the beans. As compared to coffee beverages produced by other brewing methods, such as drip brewing, an espresso brewing process results in a thicker beverage with a creamy texture and a concentrated and complex taste profile. Also, because the water is under pressure, the coffee grounds used for espresso may be ground finer than the coffee grounds used for other brewing processes. This results in greater surface area of coffee grounds for which the pressurized water can come into contact with, absorbing more of the flavor producing chemicals from within the grounds. Furthermore, for an espresso brewing process, the grounds may be tamped to provide a greater stacking efficiency of the grounds, which promotes the water's penetration of the grounds, resulting in still greater flavor extraction.

Because of its relatively high concentration, as compared to other coffee beverages, espresso may be served in a small portion referred to as a shot, measuring approximately 1 U.S. fluid ounce. Espresso may also be served in integer multiples of a shot, such as a double shot or a triple shot. Espresso is typically prepared using a specialized coffee machine, referred to as an espresso machine. Brewing a shot of espresso may be referred to as pulling a shot of espresso because some espresso machines require a user of the machine, or a barista, to pull a spring loaded lever that is attached to a piston, where pressure created by the piston forces the water through the coffee grounds. Although the construction of espresso machines may vary, the machines are often loosely categorized by the drive mechanism used to produce the required pressure. One popular method used to produce the pressure is to employ a motor driven pump. Machines that employ such a pump are often collectively referred to as pump-driven, or simply pump espresso machines.

Espresso is a popular beverage worldwide. In addition to serving espresso as a shot, espresso may be used as a base for other popular coffee beverages, such as cappuccinos, lattes, macchiatos, and americanos. Some preparations of espresso based beverages may use steam to heat and/or froth milk. Many espresso machines are able to supply the heat and pressure required to brew espresso. In addition, some machines may supply the steam that is used in the preparation of various espresso based beverages. Thus, it is with respect to these and other considerations that the present invention has been made

SUMMARY OF THE INVENTION

In one aspect of the invention, a system is configured and arranged for adjusting a brewing fluid flow rate while brewing a beverage from the flowing fluid. The system includes an input aperture, an output aperture, a first fluid-flow path, a brew tank, and a first valve. The brewing fluid flow rate is an output fluid flow rate out of the output aperture. The first fluid-flow path is in fluid communication with the input aperture and the output aperture. The pump is configured and arranged to pump fluid from the input aperture, through the first fluid-flow path, and out of the output aperture. The brew tank is configured and arranged for heating fluid flowing in the input aperture and out the output aperture. The first valve is configured and arranged to adjust a first fluid flow rate through the first fluid-flow path. In a preferred embodiment, the brewing fluid flow rate includes at least the first fluid flow rate through the first fluid-flow path.

In some embodiments, the system includes a second fluid-flow path and a second valve. The second fluid-flow path is in fluid communication with the input aperture and the output aperture. The pump is further configured and arranged to pump fluid through the second fluid-flow path. The second valve is configured and arranged to adjust a second fluid flow rate through the second fluid-flow path while brewing the beverage. In these 3 embodiments, the brewing fluid flow rate includes at least the first fluid flow rate through the first fluid-flow path and the second fluid flow rate through the second fluid-flow path.

The first valve may be positioned intermediate the pump and the brew tank. The first valve may be positioned intermediate the brew tank and the output aperture. In at least one embodiment, system includes a brew medium housing and a giggleur. The brew medium housing is configured and arranged to house a brewing medium and to receive the fluid flowing out of the output aperture at the brewing fluid flow rate. The giggleur is positioned intermediate the brew tank and the brew medium housing.

The first valve may be positioned intermediate the brew tank and the giggleur. The first valve may be positioned intermediate the giggleur and the brew medium housing. In at least one embodiment, the first valve is a needle valve. In other embodiments, the first valve is an electro-mechanical valve. The first valve is further configured and arranged to receive a signal while brewing the beverage. In response to the received signal, the first valve at least partially opens to increase the first fluid flow rate through the first fluid-flow path In some embodiments, a method for brewing a beverage employs a beverage brewing machine. The method includes adjusting a brew flow rate of fluid within the machine to a first flow rate and pumping a first volume of fluid through an output aperture of the machine at the first flow rate. Pumping the first volume provides at least a portion of the first volume of fluid to a brewing medium to pre-wet the brewing medium. The method includes adjusting the brew flow rate of the fluid to a second flow rate. The second flow rate is greater than the first flow rate. The method further includes, pumping a second volume of the fluid through the output aperture at the second flow rate and extracting at least a portion of the delivered second volume of fluid through the pre-wetted brewing medium to produce the brewed beverage. Pumping a second volume of the fluid provides at least a portion of the second volume of fluid to the pre-wetted brewing medium.

In a preferred embodiment, adjusting the brew flow rate to the second flow rate includes at least partially opening a valve positioned in a fluid-flow path of the machine. When the first volume of fluid is pumped through the output aperture, a valve positioned in a fluid-flow path of the machine is at least partially restricting a fluid-flow path of the machine. An average fluid pressure associated with the portion of the second volume of fluid that is provided to the pre-wetted brewing medium is greater than a corresponding average fluid pressure associated with the portion of the first volume of fluid that is provided to the brewing medium to pre-wet the brewing medium.

Adjusting the brew flow rate to the first flow rate may include providing a first flow path for the first volume of fluid to flow through. Adjusting the brew flow rate to the second flow rate may include providing the first flow path and a second flow path for the second volume of fluid to flow through. In at least one embodiment, adjusting the brew flow rate to the first flow rate includes providing a flow path for the first volume of fluid to flow through and adjusting the brew flow rate to the second flow rate includes increasing a cross section of the flow path for the second volume of fluid to flow through.

In some embodiments, an espresso machine is enabled to adjust a brew flow rate of water during a brewing process for a coffee beverage. The machine includes a brew tank that heats water, a pump that provides pressurized water to the brew tank, a coffee ground housing that houses coffee grounds, an output aperture, and a brew flow rate regulation system. The output aperture provides the coffee ground housing with pressurized and heated water from the brew tank. The brew flow rate regulation system adjusts the brew flow rate of water during the brewing process for the coffee beverage. The brew flow rate regulation assembly includes a first flow path in fluid communication with the pump and the output aperture.

The brew flow rate regulation system is enabled to at least partially open a first valve positioned in the first flow path during the brewing process such that the brew flow rate is increased when the first valve is at least partially opened. In various embodiments, the brew flow rate regulation system is enabled to increase the brew flow rate after a volume of fluid has been provided to the coffee ground housing. The brew flow rate regulation system may adjust the brew flow rate by actively regulating a flow through a second flow path in fluid communication with the pump and the output aperture.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
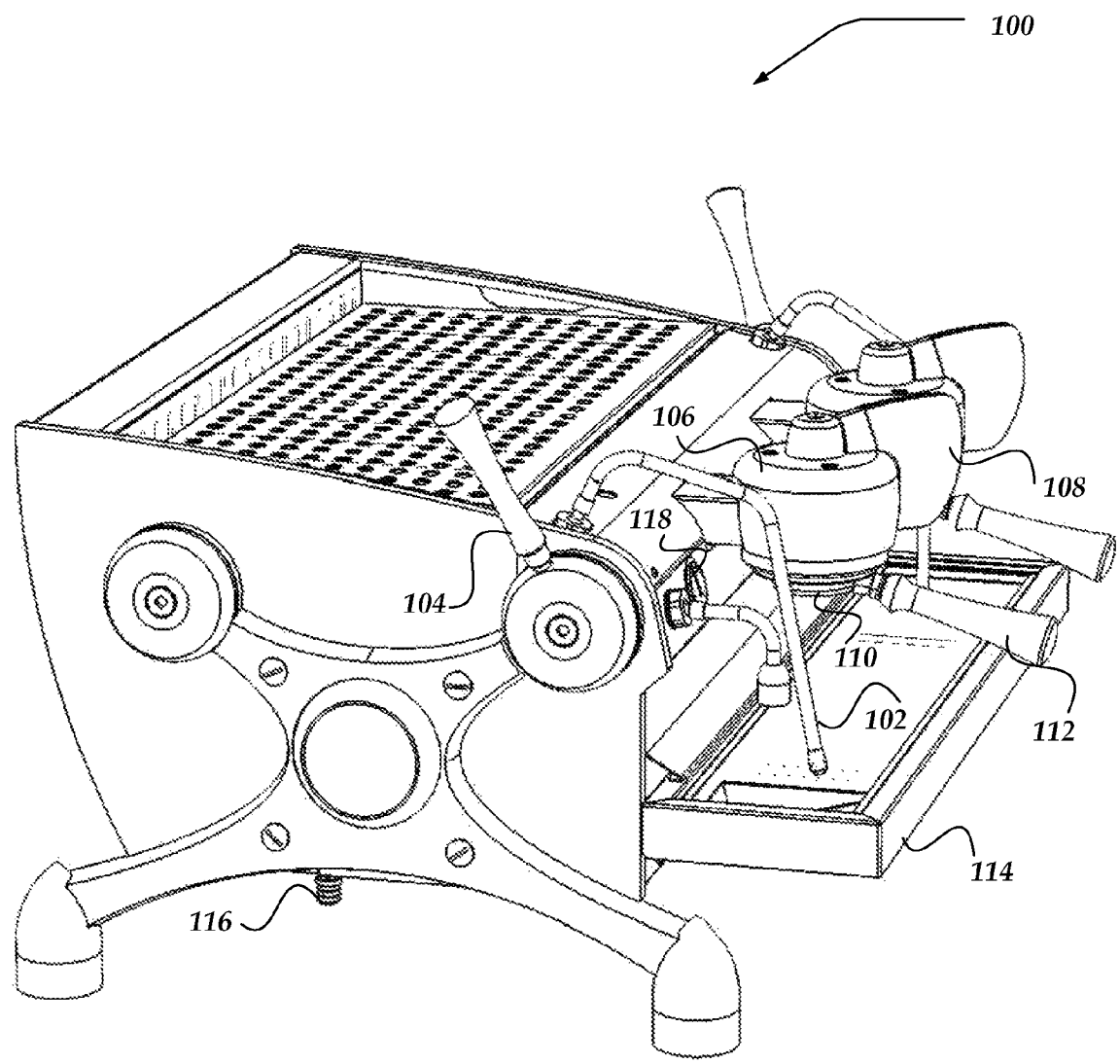
FIG. 1 illustrates a perspective view of one embodiment of a pump-driven espresso machine that regulates at least a brewing flow rate of heated pressurized water and during an espresso brewing process, according to the invention.

The flavor profile of an espresso shot is dependent upon many factors associated with the espresso machine, the coffee grounds, and the brewing process used to produce the shot. Such factors include the coarseness of the ground coffee beans, the temperature, pressure, and volume of water forced through the grounds, as well as the time for which the water is in contact with the grounds and the distribution of water over the grounds. Slowly and fully pre-wetting the grounds, prior to forcing the heated pressurized water through the grounds, may greatly increase the quality and complexity of the taste profile of the shot. Coffee beans used to make espresso may contain carbon dioxide and other gasses which may affect the taste profile of the espresso shot. Some of these gasses may be acquired by the beans during a roasting process. Whole coffee beans are roasted prior to grinding the beans and brewing espresso and preparing other coffee drinks with the ground beans. The roasting process, which involves heating the beans, is required to produce some of the characteristic flavors associated with coffee. During the roasting process, carbon dioxide may be formed within the cell structure of the coffee beans.

Slowly and fully pre-wetting the coffee grounds with water, prior to brewing espresso, may allow for the release of the carbon dioxide from the ground coffee beans. When at least a portion of the carbon dioxide is released, or out-gassed, from the ground coffee beans, the barista may grind the beans significantly finer than is otherwise possible. Many individuals experience a greater and more complex taste profile of an espresso shot if the coffee grounds have been fully pre-wetted prior to the full pressure brewing process as there is an increasing of the surface area of the finer ground coffee and more of the coffee oils are then extracted, increasing mouth-feel and decreasing bitterness of the espresso.

As herein described, a system, method, and apparatus for brewing espresso includes at least two phases: a pre-brew phase and an extraction phase. Although discussed in the context of brewing espresso, it shall be understood that the system, method, and apparatus have greater applications that just brewing espresso, and can be applied to the preparation of other substances and/or beverages such as teas, mattes, other coffee based drinks, and the like. Although water is used throughout as an example for a liquid for which to brew with, other precursors may be used within the system, method, and apparatus disclosed herein. Other precursors may include any suitable liquid and/or gas. Further, coffee beams are herein used as an example brewing medium, however it will be understood that other substances including, but not limited to other ground organic and/or inorganic matter, such as tea leaves and the like, may be used as the brewing medium.

In some embodiments, during the pre-brew phase, the grounds may be fully pre-wetted, or slowly exposed to heated pressurized water, resulting in an out-gassing reaction and releasing at least a portion of the undesired gasses from the grounds. In at least one embodiment, after the pre-brew phase is complete or otherwise terminated, the espresso brewing process may transition to the extraction phase.

During the extraction phase, heated pressurized water may be forced, or extracted, through the pre-wetted and out-gassed grounds, resulting in an espresso shot with a greater and more complex taste profile. In at least one embodiment, the pressurized water may be delivered to the coffee grounds during the pre-brew phase at a brew flow rate that is less than the brew flow rate that the heated pressurized water is delivered to the coffee grounds during the extraction phase.

FIG. 1 illustrates a perspective view of one embodiment of a pump-driven espresso machine 100 that regulates at least a brewing flow rate of heated pressurized water during an espresso brewing process, according to the invention. In FIG. 1, espresso machine 100 is shown having steam wand 102, wherein espresso machine 100 may deliver pressurized steam through at least one steam aperture (not shown) disposed on a distal end of steam wand 102. In some of the various embodiments, at least a portion of the distal end of steam wand 102, including the one or more steam apertures, may be submerged in a volume of dairy milk, or other beverage such as soy, rice, or almond milk, wherein the volume of milk may be housed by a steaming cup (not shown). Steam delivered to the volume of dairy or non-dairy milk through the one or more steam apertures may produce steamed, frothed, and/or heated milk, used to make an espresso based beverage, such as a latte or cappuccino. In some of the various embodiments, the position of the steam wand 102 may be rotatably adjustable.

In at least one embodiment, a flow rate of steam through steam wand 102 and the one or more steam apertures may be controlled by steam handle 104. In some of the various embodiments, the flow rate of steam through the at least one steam aperture may vary between a maximum flow of steam and no steam. In at least one embodiment, the flow rate of steam may depend upon the position of steam handle 104. In at least one embodiment, a user of espresso machine 100, or barista, may be enabled to rotate the position of steam handle 104 to control the flow rate of steam through steam wand 102 and the at least one steam aperture.

In some embodiments, espresso machine 100 may include brew cap assembly 106. In at least one embodiment, the heated pressurized water is delivered to coffee grounds through brew cap assembly 106. Brew cap assembly 106 may include at least one giggleur (not shown). A giggleur may include at least one of an aperture, orifice, or valve from which pressurized water is forced through and expelled out of. A giggleur may be configured and arranged to deliver a volume of water to the coffee grounds in a stream or in a spray, similar to a nozzle assembly.

Portafilter assembly 110 may be rotatably couplable to an underside of brew cap assembly 106. In at least one of the various embodiments, the barista may couple portafilter assembly 110 to the underside of brew cap assembly 106 by at least exerting a rotational force on portafilter handle 112.

In at least one embodiment, portafilter assembly 110 may house a coffee ground basket (not shown). In some embodiments, coffee ground basket may be a basket filter that houses coffee grounds. Accordingly, in at least one embodiment, brew cap assembly 106 may deliver heated pressurized water, through at least the giggleur (not shown), to coffee grounds housed in the coffee ground basket included in portafilter assembly 110 and coupled to brew cap assembly 106. In some embodiments, the coffee ground basket may permit the flow of at least a portion of the water delivered by brew cap assembly 106, but restricts the flow of the coffee grounds.

In some of the various embodiments, heated pressurized water may flow from brew cap 106 into portafilter assembly 110 and, due to at least the pressure, at least a portion of the heated pressurized water may be forced or extracted through the coffee grounds housed within coffee ground basket contained within portafilter assembly 110. Espresso may be extracted through the basket filter and flow out of portafilter assembly 110 through at least one portafilter aperture (not shown) disposed on an underside of portafilter assembly 110. The produced espresso may be deposited in an espresso shot glass (not shown) disposed on drip tray 114.

Some embodiments of espresso machine 100 may include brew pressure gauge 118, which may give an indication, or reading, of the pressure of the heated pressurized water at least one point in at least one brew flow line (not shown) included in espresso machine 100. In some embodiments, brew pressure gauge 118 may indicate the pressure within portafilter assembly 110 and between the giggleur and the coffee grounds. In at least one embodiment, brew pressure gauge 118 may be an analog gauge. In some embodiments, brew pressure gauge 118 may be a digital gauge. Espresso machine 100 may include water supply 116, which supplies water to espresso machine 100. The water from water supply 116 may be heated and pressurized by espresso machine 100 and used to produce espresso and/or steam. In some embodiments, water supply 116 may include a water filter.

In at least one of the various embodiments, espresso machine 100 may include brew handle 108. Brew handle 108 may be employed to control an espresso brewing process. In at least one of the various embodiments, the espresso brewing process may include at least two phases: a pre-brew phase and an extraction phase. The two phases may be distinct and/or independent phases. The two phases may be temporally-ordered phases, with the pre-brew phase occurring prior to the extraction phase.

In at least one embodiment, brew handle 108 may be used to initiate the espresso brewing process. In some of the various embodiments, brew handle 108 may be used to initiate the pre-brew phase of the brewing process. In some of the various embodiments, brew handle 108 may be used to transition the espresso brewing process from the pre-brew phase to the extraction phase. In at least one of the various embodiments, brew handle 108 may be used to terminate the espresso brewing process, including at least terminating the extraction phase.

In at least one of the various embodiments, brew handle 108 may be employed to control and/or adjust a brew flow rate during the espresso brewing process. In some embodiments, the brew flow rate may refer to the flow rate of heated pressurized water through espresso machine 100. In various embodiments, the brew flow rate may refer to the rate that heated pressurized water is being delivered to the coffee grounds by espresso machine 100 and used in the espresso brewing process. In at least one embodiment, brew handle 108 may be employed to toggle or transition between at least three brew flow rate settings, including an off setting (or zero-flow setting), a first brew flow rate setting, and a second brew flow rate setting. In at least one of the various embodiments, the first brew flow rate setting may be associated with the pre-brew phase. In at least one of the various embodiments, the second brew flow rate setting may be associated with the extraction phase. In at least one embodiment, the off setting may be associated with a duration phase. In some embodiments, brew handle 108 may be rotatably transitioned between the at least three settings. In at least one embodiment, the rotated position of brew handle 108 may vary continuously.

In some embodiments, each setting of brew handle 108 may enable a different brew flow rate. In at least one embodiment, the off setting, or zero-flow setting, of brew handle 108 may adjust the brew flow rate so that no water is being delivered to the coffee grounds. Accordingly, brew handle 108 may be positioned in the off setting when espresso machine 100 is not currently brewing espresso. In at least one embodiment, when brew handle 108 is positioned in the first brew flow rate setting, the brew flow rate may be regulated, adjusted, or otherwise controlled so that espresso machine 100 may deliver a volume of water to the coffee grounds at a brew flow rate equal to a first brew flow rate.

In at least one embodiment, when brew handle 108 is positioned in the second brew flow rate setting, the brew flow rate may be regulated, adjusted, or otherwise controlled so that espresso machine 100 may deliver another volume of water to the coffee grounds at a brew flow rate equal to a second brew flow rate. In some of the various embodiments, the first brew flow rate may be less than or equal to the second brew flow rate.

The first brew flow rate may be associated with the pre-brew phase of the espresso brewing process. The second brew flow rate may be associated with the extraction phase of the espresso brewing process. In at least some embodiments, the brew flow rate may be regulated, adjusted, or otherwise controlled by at least employing a brew flow rate regulating assembly (not shown) included in espresso machine 100. In some of the various embodiments, transitioning brew handle 108 between the settings may vary a pressure within portafilter assembly 110.

Espresso machine 100 may include a processor or processor device (not shown). In some embodiments, the processor device may at least control at least a portion of the espresso brewing process. In some embodiments, the processor device may adjust or control the flow rate during the espresso brewing process. In at least one embodiment, the processor device may control or adjust at least one valve included in espresso machine 100. In some embodiments, espresso machine 100 may include one or more flow meters (not shown). The flow meter may enable a measurement of the flow rate during the espresso brewing process. The flow meter may enable a measurement of a volume of water flowing during at least a portion of the espresso brewing process.

In at least one embodiment, brew handle 108 may be a "start" switch or a binary switch. In such embodiments, the flow rate is automatically controlled upon the start of a brewing sequence by depressing, rotating, or otherwise activating the "start"-style brew handle 108. At least one of the flow meters is employed to determine, in real time, flow rates and/or flow volumes during the various stages of the brew sequence. Electronics, such as the processor device, monitor the volume of water at each flow rate by signals generated at the flow meters. The electronics also automatically transition between the flow rates based on predetermined and programmed volumes of water.

Figure 2:
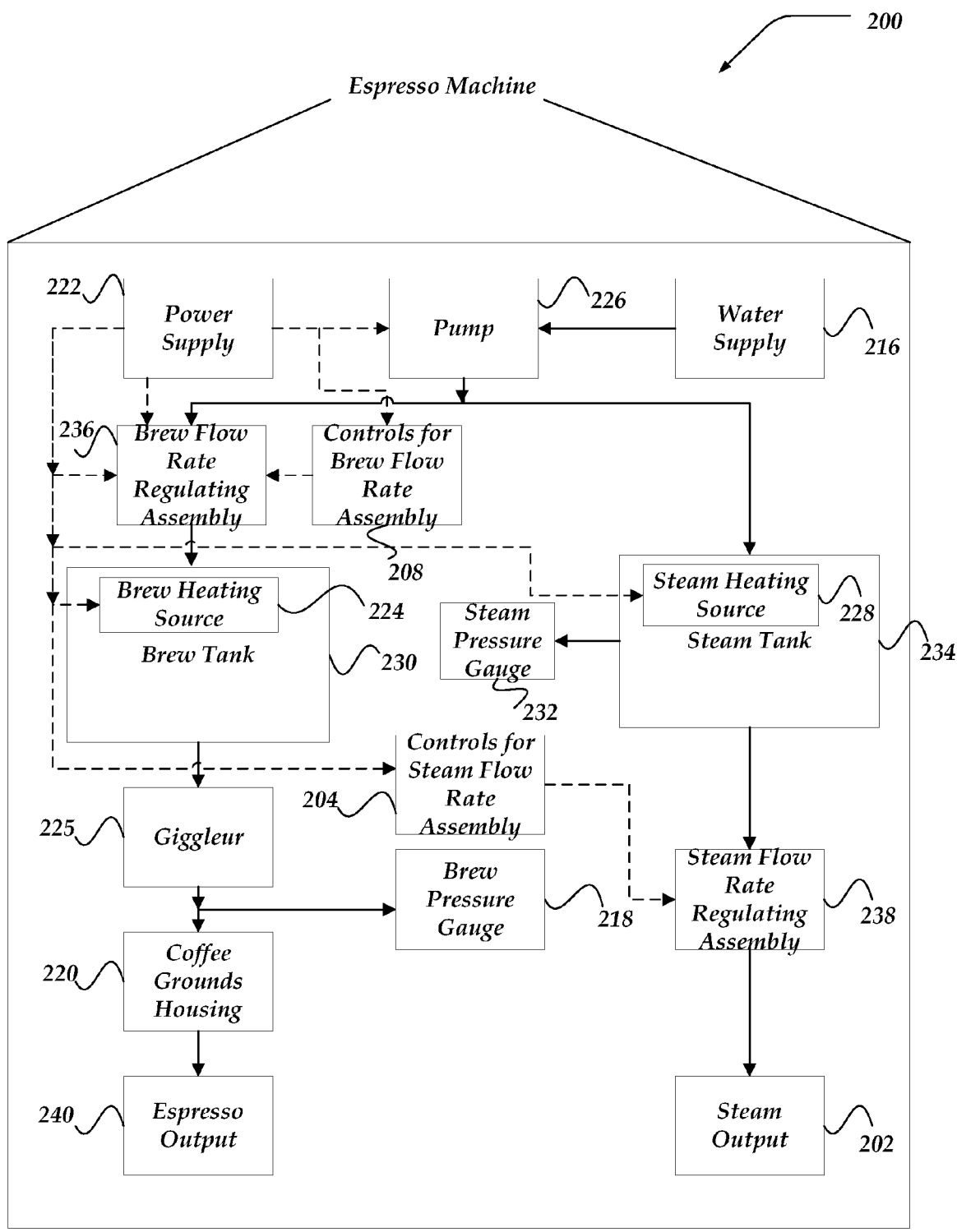
FIG. 2 illustrates a schematic view of one embodiment of a pump-driven espresso machine that includes a brew flow rate regulating assembly that enables regulating a flow rate of water during at least a portion of an espresso brewing process, according to the invention.

FIG. 2 illustrates a schematic view of one embodiment of pump-driven espresso machine 200 that includes brew flow rate regulating assembly 236 that may enable regulating a flow rate of water during at least a portion of an espresso brewing process. In various embodiments, espresso machine 200 may include power supply 222. Power supply 222 may provide at least a portion of the electrical power required to operate various components and/or assemblies of espresso machine 200, such as brew heating source 224, steam heating source 228, controls for brew flow rate assembly 208, and pump 226. In some embodiments, power supply 222 may provide at least electrical power to at least one of brew flow rate regulating assembly 236, steam flow rate regulating assembly 238, and controls for steam flow rate regulating assembly 238. In the context of FIG. 2, dashed directional lines are used to illustrate at least electrical coupling and/or electrical communication of the components. The electrical coupling may include the ability to distribute electrical power and/or electrical signals that may enable the controlling or operation of the various components. Also in the context of FIG. 2, directional solid lines are used to illustrate at least the fluid and/or pressure communication of the components.

In some embodiments, espresso machine 200 may include water supply 216. Water supply 216 may supply water to pump 226. In some embodiments, pump 226 may pump at least a portion of the water supplied by water supply 216 to brew tank 230, wherein the pumped water may be heated, pressurized, and used in the brewing of espresso. In some embodiments, pump 226 may pump water to steam tank 234, where the pumped water may be used to produce steam used in the preparation of some espresso based drinks. In some embodiments, water supply 216 may include at least a water filter. In at least one of the various embodiments, brew tank 230 and steam tank 234 may be supplied water from separate and/or independent water supplies and/or separate pumps. In at least one embodiment, brew tank 230 and steam tank 234 may be supplied water from the same water supply and/or the same pump.

In some embodiments, pump 226 may provide at least a portion of the pressure required to pressurize water stored in brew tank 230. In some embodiments, a plurality of pumps may be included in espresso machine 200. In at least one embodiment, at least one pump may be dedicated to pressurizing water stored in brew tank 230.

In at least one embodiment, espresso machine 200 may include brew heating source 224. Brew heating source 224 may provide at least a portion of the heat energy required to heat water supplied by water supply 216. At least a portion of the water heated by brew heating source 224 may be stored within brew tank 230. In at least one embodiment, brew heating source 224 may be disposed in brew tank 230. In some of the various embodiments, brew heating source 224 may include a resistive element, such as a resistive coil or other type of heating element.

Some embodiments of espresso machine 200 may include steam heating source 228. Steam heating source 228 may provide at least a portion of the heat energy required to produce steam within steam tank 234. In at least one embodiment, steam heating source 228 may be disposed within steam tank 234. In some of the various embodiments, steam heating source 228 may include a resistive element, such as a resistive coil or other type of heating element.

In at least some embodiments, brew tank 230 may store heated and pressurized water. During at least a portion of an espresso brewing process, at least a portion of the heated pressurized water stored within brew tank 230 may flow downstream from brew tank 230 to coffee grounds housed in coffee ground housing 220 and then to espresso output 240. In at least one embodiment, at least a portion of the heated pressurized water may flow through a downstream giggleur 225 before reaching coffee grounds housing 220. In some embodiments, giggleur 225 may include at least an aperture or an orifice. In some embodiments, giggleur 225 may include a nozzle and/or valve. In some embodiments, a diameter of the aperture or orifice included in giggleur 225 may be with a range, such as 0.5 mm to 1.0 mm. In at least some embodiments, the diameter of the aperture or orifice may be approximately 0.7 mm. In at least one embodiment, giggleur 225 may be characterized by at least a feature size of the included aperture or orifice.

In at least one of the various embodiments, coffee ground housing 220 may be included in a portafilter assembly, such as portafilter assembly 110 of FIG. 1. In at least some embodiments, steam tank 234 may store pressurized steam. In some embodiments, at least a portion of the steam stored within steam tank 234 may flow from steam tank 234 to steam output 202.

In at least one embodiment, espresso machine 200 may include brew pressure gauge 218. Brew pressure gauge 218 may give an indication of pressure at at least one point between pump 226 and coffee ground housing 220. In at least one embodiment, brew pressure gauge may give an indication of pressure downstream of giggleur 225 and upstream of coffee grounds.

In at least one embodiment, espresso machine 200 may include steam pressure gauge 232. Steam pressure gauge 232 may give an indication of the pressure at at least one point between pump 226 and steam output 202. In at least one embodiment, steam pressure gauge 232 may be an analog gauge. In some embodiments, steam pressure gauge 232 may be a digital gauge.

In at least one embodiment, espresso machine 200 may include brew flow rate regulating assembly 236. In some embodiments, brew flow rate regulating assembly 236 may be upstream of brew tank 236. During at least a portion of the espresso brewing process, water may flow from pump 226 and through brew flow rate regulating assembly 236 before reaching brew tank 230. In at least one alternative embodiment, brew flow rate regulating assembly 236 may be downstream of brew tank 235, but upstream of giggleur 225.

In at least one of the various embodiments, brew flow rate regulating assembly 236 may regulate, or limit, the flow rate of heated pressurized water arriving at coffee ground housing 220, during at least a portion of the espresso brewing process. In at least one of the various embodiments, giggleur 225 may regulate, or limit, the flow rate of heated pressurized water arriving at coffee ground housing 220, during at least a portion of the espresso brewing process.

At coffee ground housing 220, the flow rate regulated water may be exposed to coffee grounds housed within. In some embodiments, at least a portion of the flow regulated water delivered to coffee grounds may pre-wet the coffee grounds. At least a portion of the flow regulated water delivered to coffee grounds, may be extracted through the pre-wetted coffee grounds to produce espresso. In some embodiments, at least a portion of the extracted espresso may exit espresso machine 200 through espresso output 240. In at least one embodiment, espresso output 240 may include at least a portafilter aperture, such as the portafilter aperture discussed in the context of FIG. 1. The produced espresso may flow from espresso machine 100 via the portafilter aperture.

In at least one embodiment, brew flow rate regulating assembly 236 may adjustably regulate the flow rate of heated pressurized water flowing to coffee ground housing 220. Various embodiments of brew flow rate regulating assembly 236 are described in greater detail with regard to FIGS. 3-6. However, briefly stated, in at least one embodiment, brew flow rate regulating assembly 236 may include at least one flow path, wherein a flow rate of water, which flows into and out of brew flow rate regulating assembly 236, may be regulated, adjusted, or otherwise controlled. In at least one embodiment, regulating, adjusting, or otherwise controlling the flow rate of water into and out of brew flow rate regulating assembly 236 may regulate, adjust, or otherwise control the brew flow rate of water delivered to the coffee grounds during an espresso brewing process. In at least one embodiment, regulating, adjusting, or otherwise controlling the flow rate of water into and out of brew flow rate regulating assembly 236 may regulate, adjust, or otherwise control the pressure of the water delivered to the coffee grounds during an espresso brewing process.

In some embodiments, brew flow rate regulating assembly 236 may include a plurality of flow paths, where a flow rate of pressurized water, for each individual flow path in the plurality of flow paths, may be regulated, adjusted, or otherwise controlled. In some embodiments, the plurality of flow paths may include independent flow paths. In at least one of the various embodiments, at least a portion of the plurality of flow paths may include parallel flow paths. In some embodiments, the independent flow paths may vary in both transverse and longitudinal size and/or shape. In some embodiments, the independent flow paths may vary in transverse diameter or transverse cross-sectional area. In at least one embodiment, a flow rate through brew flow rate regulating assembly 236 may include the sum of at least a portion of the individual flow rates of each of the plurality of flow paths.

In some embodiments, brew flow rate regulating assembly 236 may include at least one flow regulating valve. In some embodiments, brew flow rate regulating assembly 236 may include a plurality of flow regulating valves. In at least one embodiment, a flow regulating valve may be an adjustable flow regulating valve. In some embodiments, an adjustable valve may be opened and/or closed. In at least one embodiment, an adjustable valve may include an aperture, wherein the size of the aperture is adjustable. A flow regulating valve may be a needle valve. A motor, such as a stepper motor may be employed to control the needle valve in real time. The motor may be included in the brew flow rate regulating assembly 236. The flow rate is at least partially controlled by the motor opening and closing the needle valve. In some embodiments, a flow regulating valve may be a solenoid valve, such as a two way (2-way) solenoid valve or a three way (3-way) solenoid valve. In some embodiments, a flow regulating valve may be a jet valve.

In some embodiments, the flow rate through at least one of the flow paths may be regulated by the at least one flow regulating valve. In some embodiments, the flow rate through brew flow rate regulating assembly 236 may be regulated by at least opening and/or closing the at least one flow regulating valve. In some embodiments, the flow rate through brew flow rate regulating assembly 236 may be regulated by at least adjusting an aperture size for at the least one flow regulating valve.

In at least one embodiment, controls for brew flow rate regulating assembly 208 may be employed to control, adjust, or limit the flow rate through brew flow rate assembly 236. In at least one embodiment, the brew flow rate may be adjusted during the espresso brewing process by manipulating the controls for the brew flow rate regulating assembly 208. In at least one embodiment, the controls for the brew flow rate regulating assembly 208, may include a brew handle, such as brew handle 108 of FIG. 1. Controls 208 may include controls for the motor that opens and close the needle valve.

In at least one embodiment, espresso machine 200 may include steam flow rate regulating assembly 238. During at least a portion of a steaming process, pressurized steam may flow from steam tank 234 and through steam flow rate regulating assembly 238 before being expelled from espresso machine 200 at steam output 202. In at least one embodiment, steam flow rate regulating assembly 238 may include a steam valve that controls the steam flowing through steam output 202.

In at least one embodiment, steam output 202 may include the at least a steam wand, such as steam wand 102 of FIG. 1. In some of the various embodiments, the steam flow regulating assembly may be controlled by controls for steam flow regulating assembly 204. In at least one of the various embodiments, controls for steam flow regulating assembly 204 may include steam handle, such as steam handle 104 shown in FIG. 1. In some embodiments, controls for steam flow regulating assembly may include electronics that measure and/or control the pressure in the steam tank.

In addition to a pre-brew phase and an extraction phase, at least some embodiments of the espresso brewing process may include a duration phase. In at least some embodiments, the duration phase may occur between the pre-brew phase and the extraction phase. A duration phase may allow for a more complete out-gassing reaction. In at least one embodiment, the brew flow rate may be adjusted to a third brew flow rate during the duration phase. In at least some embodiments, the third brew flow rate may be zero during the duration phase of the espresso brewing process. In at least some embodiments, the third brew flow rate during the duration phase may be non-zero. In at least one embodiment, the third brew flow rate may be less than or equal to the first brew flow rate. In some embodiments, the third brew flow rate may be greater than the first brew flow rate.

In some of the various embodiments, the brew flow rate of heated pressurized water delivered to the coffee grounds may be regulated during both the pre-brew phase and the extraction phase. In at least one of the various embodiments, the flow rate of water during the pre-brew phase may be less than the flow rate of water during the extraction phase. In at least one of the various embodiments, the flow rate of water during the pre-brew phase and the flow rate of water during the extraction phase may be regulated by employing at least brew flow rate regulation assembly 236 included in espresso machine 200. In at least one of the various embodiments, a user of the espresso machine may adjust the flow rate of water delivered to the coffee grounds by operating controls for brew flow rate assembly 208 included in espresso machine 200.

In at least one embodiment, a pressure that the water is delivered to the coffee grounds may vary during the espresso brewing process. In at least one of the various embodiments, qualitatively, the pressure of the water delivered to the coffee grounds during the pre-brew phase is generally less than the pressure during the extraction phase. The generally higher pressure of the water during the extraction phase may force the water through the coffee grounds. In some embodiments, the lower pressure associated with the pre-brew phase allows the water to pre-wet and/or saturate the grounds SLOWLY, but is not enough pressure to force the water through the grounds to produce properly extracted espresso.

In at least one of the various embodiments, the pressure of the water delivered to the coffee grounds, during the espresso brewing process, may be controlled and/or varied by at least regulating the brew flow rate of water through the espresso machine. In at least one of the various embodiments, the pressure of the water delivered to the coffee grounds, during the espresso brewing process, may be controlled and/or varied by controlling and/or varying a pump included in the espresso machine. In at least one embodiment, the pressure and/or volume may be a function of time during the espresso brewing process. The exact nature and shape of the function over the course of the brewing process may greatly affect the taste of the brewed espresso.

In at least one embodiment, the user may control the brewing process, including at least initiating the pre-brew phase, transitioning to the extraction phase, and ending the brew process by operating at least espresso machine controls. In some embodiments, the user may also control a duration phase, where the brew flow rate is regulated during a duration of time or water volume between the pre-brew phase and the extraction phase. In at least one embodiment, the brew flow rate may be turned off during the duration phase. In some of the various embodiments, the espresso machine may include a brew handle. The user may control, adjust, or otherwise vary the brew flow rate throughout the brewing process by manipulating the brew handle. In at least one embodiment, the user may control, adjust, or otherwise vary the pressure of the water delivered to the coffee grounds during the espresso brewing process by at least controlling, adjusting, or otherwise varying the brew flow rate. In some embodiments, the user may be enabled to continuously adjust or vary the brew flow rate during the espresso brewing process. In other embodiments, the user may be enabled to adjust, vary, or transition the brew flow rate between discrete brew flow rates, such as a first brew flow rate, a second brew flow rate, and the like. In some embodiments, the user may be enabled to continuously adjust or vary the pressure of water delivered to the coffee grounds during the espresso brewing process.

Figure 3:
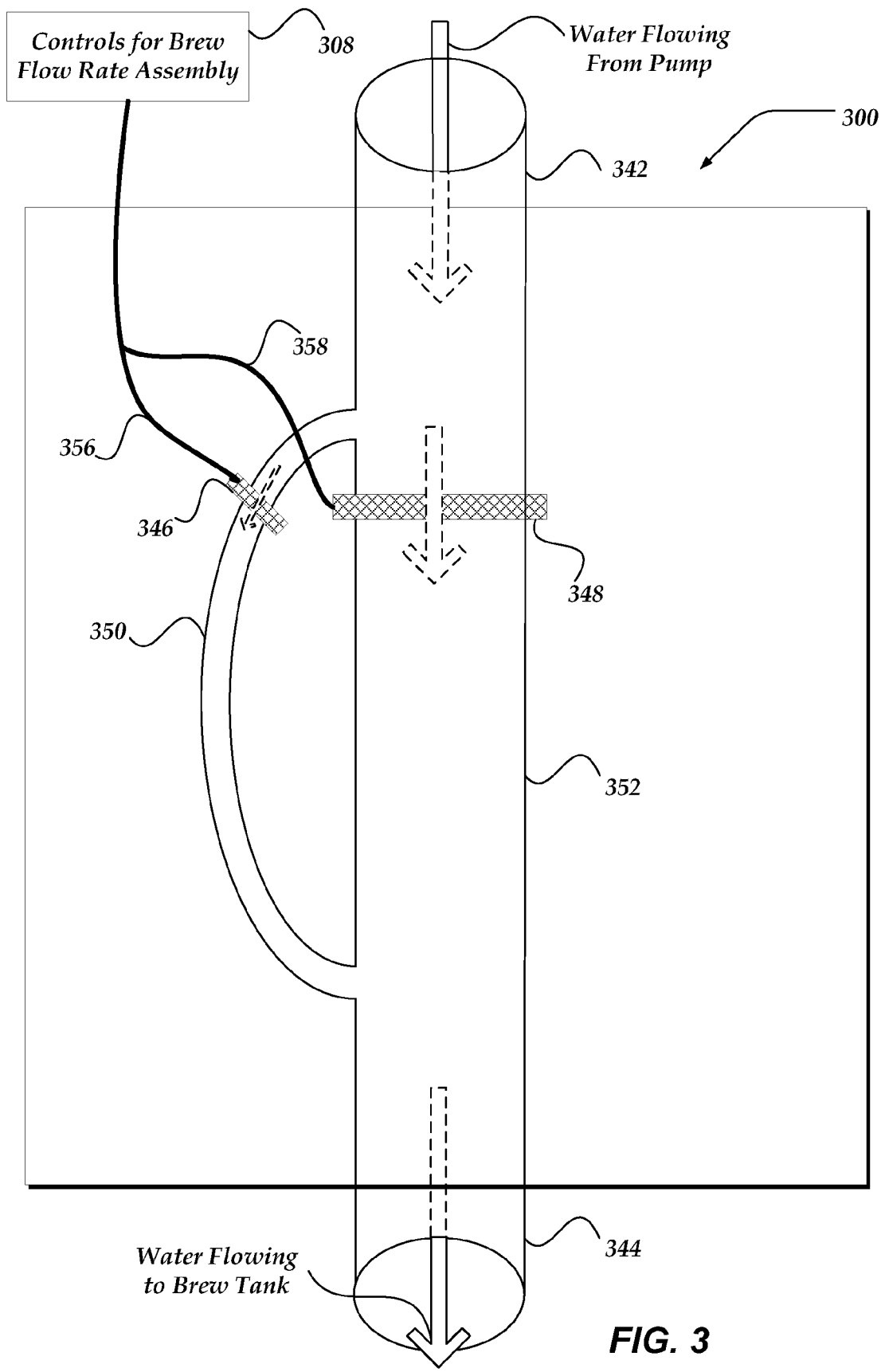
FIG. 3 illustrates schematically one embodiment of a brew flow rate regulation assembly that includes two flow paths, according to the invention.

FIG. 3 illustrates schematically one embodiment of brew flow rate regulation assembly 300, which includes two flow paths. In some of the various embodiments, brew flow rate regulation assembly 300 may be disposed downstream of pump 226 but upstream of brew tank 230, both of FIG. 2. In at least one embodiment, brew flow rate regulation assembly 300 may include brew regulation assembly input 342. In some embodiments, the pump may pump water into brew flow rate regulation assembly 300 through brew regulation assembly input 342. In FIG. 3, water entering brew flow rate regulation assembly 300 is represented by the arrow shown pointing into brew regulation assembly input 342.

In at least one embodiment, brew flow rate regulation assembly 300 may include brew regulation assembly output 344. In some embodiments, the pressurized water that enters brew flow rate regulation assembly 300 through brew regulation assembly input 342, may exit brew flow rate regulation assembly 300 through brew regulation assembly output 344. In FIG. 3, water exiting brew flow rate regulation assembly 300 is represented by the arrow shown pointing out of brew regulation assembly output 344. In at least one embodiment, at least a portion of the pressurized water that exits brew flow rate regulation assembly 300 through brew flow rate regulation assembly output 344 may flow to a brew tank, such as brew tank 230 of FIG. 2, after exiting brew flow rate regulation assembly 300. At least a portion of the pressurized water that enters the brew tank may flow to the coffee grounds in order to pre-wet the coffee grounds, during at least a portion of an espresso brewing process. At least a portion of the pressurized water that flows to the coffee grounds may be extracted through the coffee grounds to produce espresso, during at least another portion of the espresso brewing process.

In some of the various embodiments, brew flow rate regulation assembly 300 may include a plurality of flow paths, including at least first flow path 350 and second flow path 352. In some embodiments, brew flow rate regulation assembly 300 may include additional flow paths, such as at least a third flow path. For instance, the third flow path 454 shown in FIG. 4. During at least a portion of the espresso brewing process, pressurized water may flow through at least one of first flow path 350 and second flow path 352. In some embodiments, during at least a portion of the espresso brewing process, pressurized water may flow simultaneously through both of first flow path 350 and second flow path 352. In some embodiments, during at least a portion of the espresso brewing process, pressurized water may flow through first flow path 350, but not through second flow path 352. In some embodiments, during at least a portion of the espresso brewing process, pressurized water may flow through second flow path 352, but not through first flow path 350.

In at least one embodiment, first flow path 350 may be defined by at least one of a first transverse cross-sectional area or a first transverse equivalent cross-sectional area. In some embodiments, a transverse cross-sectional area of first flow path 350 may be uniform. In other embodiments, the transverse cross-sectional area of first flow path 350 may be non-uniform. In some embodiments, the first transverse cross-sectional area may be defined by at least one of a first diameter, first radius, or other first linear dimension. In at least one embodiment, the first transverse cross-sectional area may be defined by at least two linear dimensions, such as a first width and a first height. For at least some embodiments, the flow of pressurized water through first flow path 350 may be limited by the first transverse cross-sectional area.

In at least one embodiment, water may flow into first flow path 350 through at least brew regulation assembly input 342. In some embodiments, water that flows through first flow path 350 may flow out of brew flow rate regulation assembly 300 through brew regulation assembly output 344. In at least one embodiment, the flow rate of water entering into first flow path 350 may be regulated, or limited, by at least first valve 346. In at least one embodiment, first valve 346 may be disposed within first flow path 350 or near an input to first flow path 350.

In some embodiments, first valve 346 may be an adjustable valve. In at least one embodiment, first valve 346 may be a controllable valve, where first valve 346 is at least partially controlled or adjusted by at least controls for brew flow rate regulating assembly 308, where controls for brew flow regulating assembly 308 may include controls for brew flow rate regulating assembly 236 of FIG. 2. In at least one embodiment, controls for brew flow rate regulating assembly 308 may include a brew handle, such as brew handle 108 of FIG. 1. In at least one embodiment, controls for brew flow rate regulating assembly 308 may include an adjustment knob.

In some embodiments, control signal line for first valve 356 may carry a first control signal from controls for brew flow rate regulating assembly 308 to first valve 356. The first control signal may adjust, control, or otherwise operate first valve 346. The first control signal may be a mechanical signal, electrical signal, optical signal, or the like. In at least one embodiment, controlling or operating first valve 346 may include enabling the opening or closing of first valve 346. An open first valve 346 may enable water to flow through first flow path 350. In FIG. 3, water flowing into first flow path 350 through first valve 346 is represented by the arrow placed in first flow path 350. When closed, first valve 346 may prohibit, or block, water from flowing through first flow path 350.

In some embodiments, first valve 346 may include at least a first valve aperture (not shown), wherein an aperture size of the first valve aperture may be adjusted to regulate the flow of water through first flow path 350. In some embodiments, the size of the first valve aperture may be adjusted by employing at least controls for brew flow rate regulating assembly 308. In some embodiments, the size of the first valve aperture may be adjusted by employing other controls, such as a rotatable mechanism, such as a knob adjustment, mechanically connected to, or included in, first valve 346. In at least one embodiment, first valve 346 may be a needle valve, wherein the aperture size of the first valve 346 may be adjusted by adjusting the placement of the needle, or plunger. In at least one embodiment, first valve 346 may be a solenoid valve, such as a 2-way solenoid valve or a 3-way solenoid valve. In at least one embodiment, first valve 346 may be a jet valve or a nozzle.

In at least one embodiment, second flow path 352 may be defined by at least a second transverse cross-sectional area or a second equivalent transverse cross-sectional area. In some embodiments, a transverse cross-sectional area of second flow path 352 may be uniform.

In other embodiments, the transverse cross-sectional area of second flow path 352 may be non-uniform. In some embodiments, the second average transverse cross-sectional area may be defined by at least one of a second diameter, second radius, or other second linear dimension. In at least one embodiment, the second transverse cross-sectional area may be defined by at least two linear dimensions, such as a second width and a second height. For at least some embodiments, the flow of pressurized water through second flow path 352 may be limited by the second transverse cross-sectional area. In at least one embodiment, the transverse cross-sectional area of first flow path 350 may be less than or equal to the transverse cross-sectional area of second flow path 352. In at least one embodiment, the transverse cross-sectional area of first flow path 350 may be greater than the transverse cross-sectional area of second flow path 352.

In at least one embodiment, water may flow into second flow path 352 through at least brew regulation assembly input 342. In some embodiments, water that flows through second flow path 352 may flow out of brew flow rate regulation assembly 300 through brew regulation assembly output 344. In at least one embodiment, water flowing into second flow path 352 may be regulated, or limited, by at least second valve 348. In at least one embodiment, second valve 348 may be disposed within second flow path 352 or near an input to second flow path 352.

In some embodiments, second valve 348 may be an adjustable valve. In at least one embodiment, second valve 348 may be a controllable valve, where second valve 348 is at least partially controlled or adjusted by at least controls for brew flow rate regulating assembly 308. In some embodiments, control signal line for second valve 358 may carry a second control signal from controls for brew flow rate regulating assembly 308 to second valve 358. The second control signal may adjust, control, or otherwise operate second valve 348. The second control signal may be a mechanical signal, electrical signal, optical signal, or the like. In at least one embodiment, controlling or operating second valve 348 may include enabling the opening or closing of second valve 348. An open second valve 348 may enable water to flow through second flow path 352. In FIG. 3, water flowing into second flow path 352 through second valve 348 is represented by the arrow placed in second flow path 352. When closed, second valve 348 may prohibit water from flowing through second flow path 352.

In some embodiments, second valve 348 may include at least a second valve aperture (not shown), wherein an aperture size of the first valve aperture may be adjusted to regulate the flow of water through second flow path 352. In some embodiments, the size of the second valve aperture may be adjusted by employing at least controls for brew flow rate regulating assembly. In some embodiments, the size of the second valve aperture may be adjusted by employing other controls, such as a rotatable mechanism mechanically connected to, or included, in the valve. In at least one embodiment, second valve 348 may be a needle valve, wherein the aperture size of second valve 348 may be adjusted by adjusting the placement of the needle. In at least one embodiment, second valve 348 may be a solenoid valve, such as a 2-way solenoid valve or a 3-way solenoid valve. In some embodiments, second valve 348 may be a jet valve or a nozzle.

In at least one of the various embodiments, first flow path 350 and second flow path may be parallel flow paths. In at least one of the various embodiments, first valve 346 and second valve 348 may be adjusted or operated independently. In at least one of the various embodiments, first valve 346 and second valve 348 may be controlled independently. In at least one of the various embodiments, the first aperture size of first valve 346 and the second aperture size of second valve 348 may be adjusted and/or controlled independently. In at least one of the various embodiments, first valve 346 may be opened and closed independently of second valve 348. In at least one of the various embodiments, second valve 348 may be opened and closed independently of first valve 346.

In some embodiments, a first flow rate through first flow path 350 may be adjusted by at least one of opening first valve 346, closing first valve 346, or adjusting first aperture size of first valve 346. In some embodiments, a second flow rate through second flow path 352 may be adjusted by at least one of opening second valve 348, closing second valve 348, or adjusting second aperture size of second valve 348. In at least one embodiment, the flow rate through brew flow rate regulation assembly 300 may be equal to the sum of flow rates through the plurality of flow paths, including at least the first flow rate through first flow path 350 and the second flow rate through second flow path 352.

For instance, if the magnitude of flow path flow rates are represented by the size of the various arrows in FIG. 3, then the size of the arrow in brew regulation assembly input 342 may equal the size of the arrow in brew regulation assembly output 344, and the size of both arrows may represent the flow rate through brew flow rate regulation assembly 300. Furthermore, the sum of the size of the arrow in first flow path 350 and the size of the arrow in second flow path 352 may represent the flow rate through brew flow rate regulation assembly 300 and may be equal to the size of the arrow in brew regulation assembly input 342 and the size of the arrow in brew regulation assembly output 344. Accordingly, in some embodiments, the flow rate through brew flow regulation assembly 300 may be adjusted by at least one of opening first valve 346, closing first valve 346, adjusting first aperture size of first valve 346, opening second valve 348, closing second valve 348, or adjusting second aperture size of second valve 348.

In at least one embodiment, during at least one portion of the espresso brewing process, the first flow path flow rate through first flow path 350 may be less than or equal to the second flow path flow rate through second flow path 352. During at least one portion of the espresso brewing process, the first flow path flow rate through first flow path 350 may be greater than the second flow path flow rate through second flow path 352. In at least one portion of an espresso brewing process, first valve 346 may be open. In at least one portion of an espresso brewing process, first valve may 346 may be closed, prohibiting the flow of water through at least first flow path 350. In at least one portion of an espresso brewing process, second valve may 348 may be open. In at least one portion of an espresso brewing process, second valve 348 may be closed, prohibiting the flow of water through at least second flow path 352.

For instance, in at least one embodiment, second flow path 352 may serve as a by-pass and second valve 348 may be open for only a portion of the espresso brewing process, such as the extraction phase. In at least one embodiment, second valve may be closed during at least a pre-brew phase of the espresso brewing process.

Figure 4:
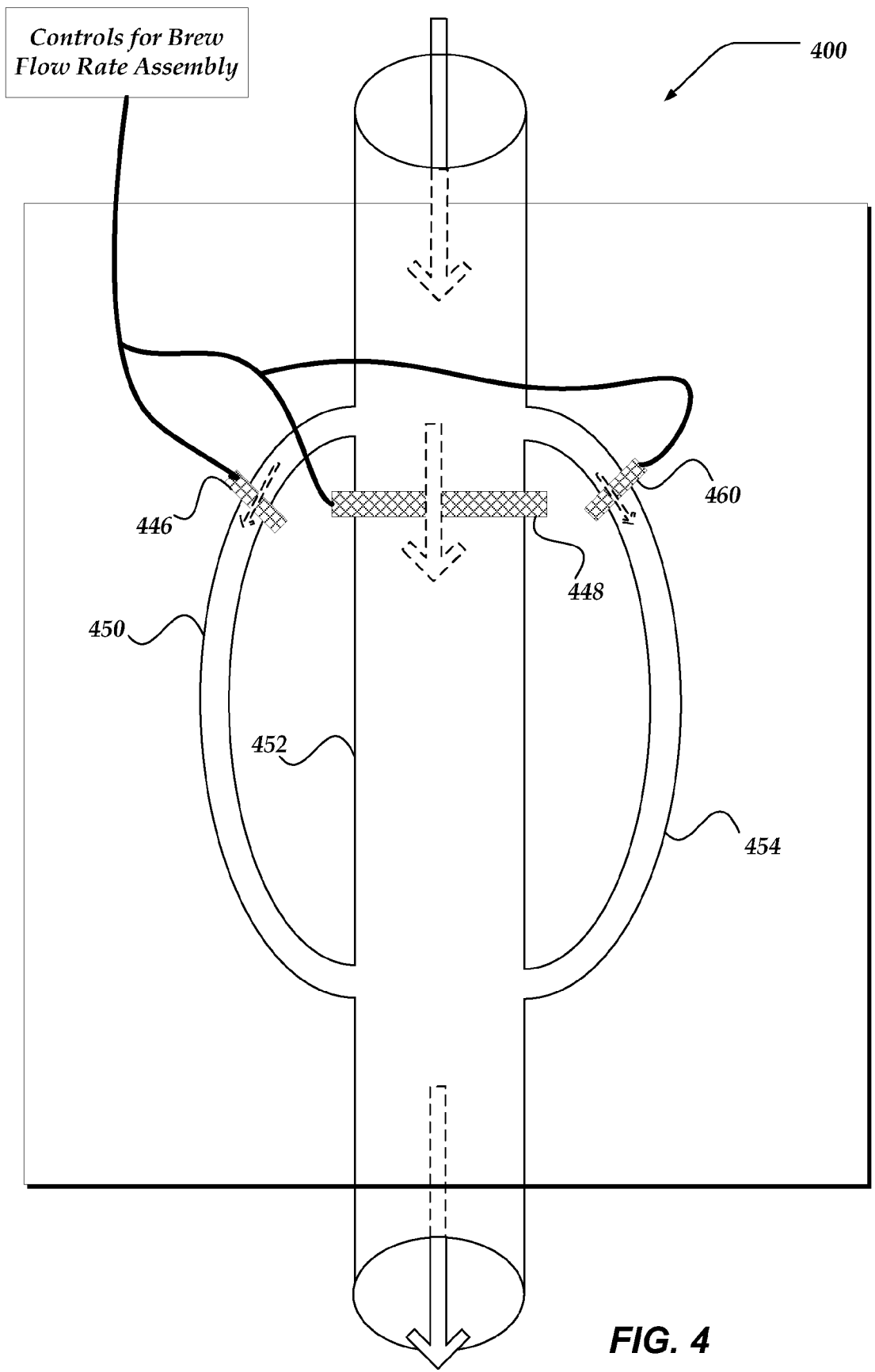
FIG. 4 illustrates schematically another embodiment of a brew flow rate regulation assembly that includes three flow paths, according to the invention.

In some embodiments, regulating the brew flow rate may be enabled with a brew flow rate regulating assembly with at least three flow path paths. FIG. 4 illustrates schematically another embodiment of a brew flow rate regulation assembly 400 that includes three flow paths. The functionality and operability of brew flow rate regulation assembly 400 is analogous to brew flow rate regulation assembly 300 of FIG. 3. However, brew flow rate regulation assembly 400 may regulate the brew flow rate by employing at least three flow paths: first flow path 450, second flow path 452, and third flow path 454.

Furthermore, brew flow rate regulation assembly 400 may regulate the brew flow rate by employing at least three counterpart valves: first valve 446, second valve 448, and third valve 460. In some embodiments, regulating the brew flow rate during an espresso brewing process may be accomplished by at least employing a number of flow paths greater than three and a number of flow regulating valves greater than or less than three. Any desired level of granularity of adjustable flow rate values may be accomplished by the appropriate choice of a number of flow paths, a transverse cross-sectional area for each of the flow paths, arrangement and configuration of a plurality of adjustable valves, and an aperture size for each of the plurality of the adjustable valves.

Figure 5:
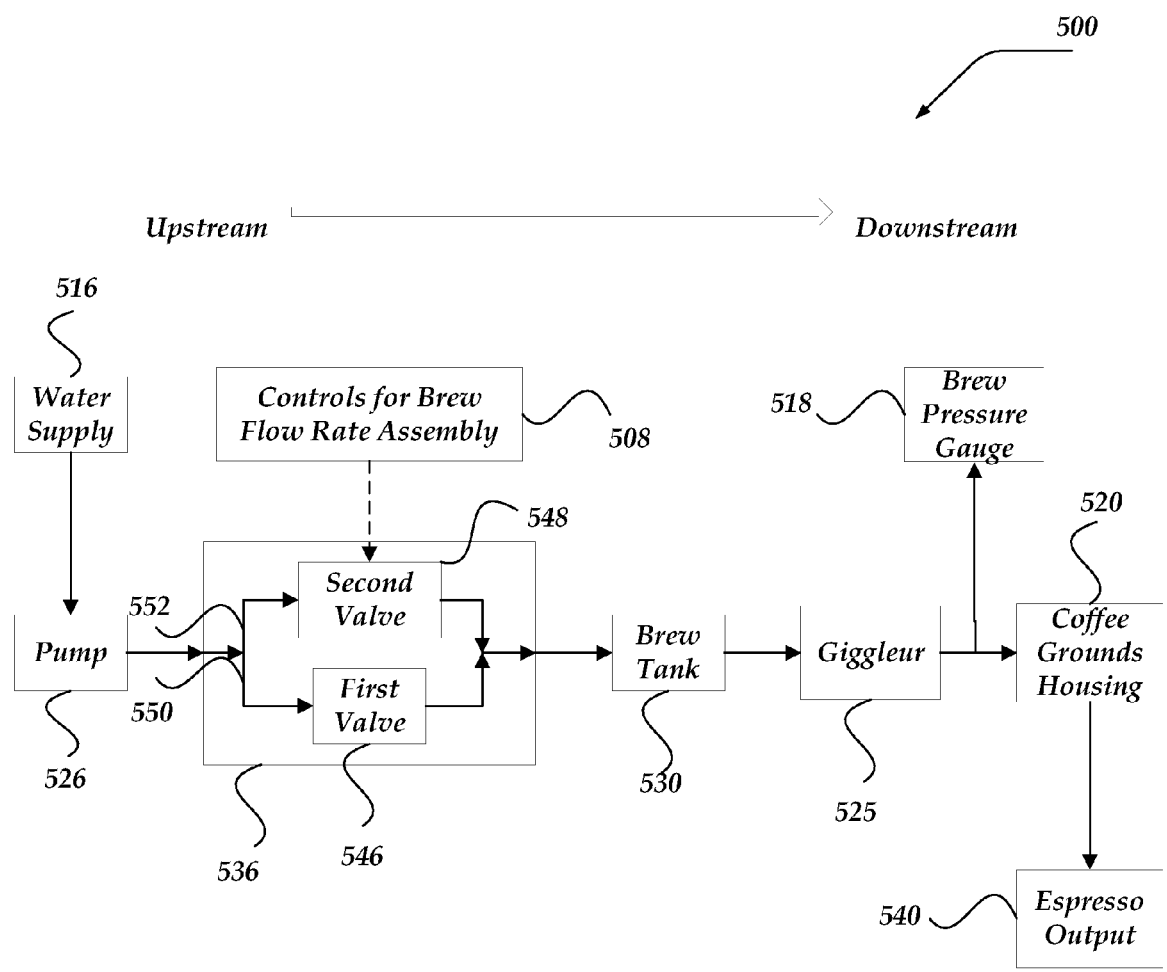
FIG. 5 illustrates schematically one embodiment of a pump-driven espresso machine that includes brew flow rate regulating assembly that enables regulating a flow rate of water during an espresso brewing process, according to the invention.

FIG. 5 illustrates a schematic view of one embodiment of a pump-driven espresso machine 500 that includes brew flow rate regulating assembly 536 that may enable regulating a flow rate of water during at least a portion of an espresso brewing process, according to the invention. The upstream indicator, the downstream indicator, and the direction the arrow, between the upstream and downstream indicators, define the upstream/downstream convention used herein. In the context of FIG. 5, dashed directional lines are used to illustrate at least electrical coupling and/or electrical communication of the components. The electrical coupling may include the ability to distribute electrical power and/or electrical signals that may enable the controlling or operation of the various components. Also in the context of FIG. 5, directional solid lines are used to illustrate at least the fluid and/or pressure communication of the components.

In at least one embodiment, during the espresso brewing process, pressurized water may flow through espresso machine 500 at a flow rate denoted by f In some embodiments, f may vary during the espresso brewing process. In some embodiments, during the espresso brewing process, the water flowing through espresso machine 500 may be delivered to coffee grounds stored in coffee grounds housing 520. During at least a portion of the espresso brewing process, such as a pre-brew phase, the water delivered to the coffee grounds may pre-wet the coffee grounds and flow rate f may be equal to a first flow rate. In some embodiments, the flow rate may vary during the pre-brew phase. In some embodiments, f may be a function of time or flow volume during at least the pre-brew phase. In at least one embodiment, the average flow rate during the pre-brew phase may be equal to the first flow rate.

During at least another portion of the espresso brewing process, such as the extraction phase, the water delivered to the pre-wet coffee grounds may be extracted through the coffee grounds to produce espresso. The produced espresso may flow out of espresso machine 500 through espresso output 540. In some embodiments, flow rate f during the extraction phase may be equal to a second flow rate. In some embodiments, the flow rate may vary during the extraction phase. In some embodiments, f may be a function of time or flow volume during at least the extraction phase. In at least one embodiment, the average flow rate during the extraction phase may be equal to the second flow rate. In some embodiments, the second flow rate may be equal to or greater than the first flow rate.

In some embodiments, pressurized water flowing through espresso machine may be stored in brew tank 530 for a duration of time. In at least one embodiment, while stored in brew tank 530, pressurized water may be heated. In at least one of the various embodiments, the pressurized heated water may flow through giggleur 525 before being delivered to coffee grounds in coffee ground housing 520. In some embodiments, giggleur 525 may include a flow limiting valve, such as a jet valve, or a nozzle. In some embodiments, giggleur 225 may include an aperture or orifice. In some embodiments, giggleur 225 may be characterized by at least a diameter, $d_0$. In some embodiments, $d_0$ may be approximately 0.7 mm.

According to at least one embodiment, water supply 516 may supply water to pump 526. In some embodiments, pump 526 may pump at least a portion of the supplied water to brew flow rate regulating assembly 536. In some embodiments, due to at least pump 526, the water pumped into brew flow rate regulating assembly 536 may be pressurized at an initial pressure, $P_0$. In at least one embodiment, $P_0$ may vary between 1 and 15 bars. In some embodiments, $P_0$ may be approximately 9 bars. In at least some embodiments, $P_0$ may vary throughout the espresso brewing process. For instance, $P_0$ during the pre-brew phase may be less than $P_0$ during the extraction phase. In some embodiments, $P_0$ may be a function of time or flow volume and vary continuously throughout the espresso brewing process.

In some embodiments, flow rate regulating assembly 536 may include at least first flow path 550 and second flow path 552. In some embodiments, flow through first flow path 550 may be regulated by at least first valve 546. In some embodiments, first valve 546 may be a needle valve. In some embodiments, a diameter, or other defining linear dimension, of needle valve 550 may be adjusted to a first diameter, such as $d_1$, prior to the espresso brewing process. In some embodiments, $d_1$ may be less than giggleur 525 diameter $d_0$. In at least one embodiment, needle valve 546 may be adjusted so that $d_1$ is approximately 0.1 mm. In at least one embodiment, needle valve 546 may be adjusted so that $d_1$ is within a range, including 0.01 mm to 0.7 mm.

In some embodiments, flow through second flow path 552 may be regulated by at least second valve 548. In some embodiments, second valve 548 may be a solenoid valve. In some embodiments, solenoid valve 548 may be closed during at least a portion of the espresso brewing process, such as the pre-brew phase. In at least one embodiment, solenoid valve 548 may be open during at least another portion of the espresso brewing process, such as the extraction phase. In some embodiments, controlling the opening and closing of solenoid valve 548 during the espresso brewing process may be enabled by at least controls for brew flow rate assembly 508.

When solenoid valve 548 is open, water may flow through second flow path 552. When solenoid valve 548 is closed, water may be blocked by at least a portion of solenoid valve 548, or a plunger included in solenoid valve 548, and prohibited from flowing through second flow path 552. In some embodiments, when solenoid valve 548 is open, second flow path may be approximated as a pipe with second transverse diameter, such as $d_2$, with regards to fluid dynamics. In some embodiments, $d_2$ may be greater than $d_1$. In some embodiment, $d_2$ may be greater than giggleur 525 diameter $d_0$. In at least one embodiment, $d_2$ may be less than giggleur 525 diameter $d_0$.

The flow rate through first flow path 550 may be denoted by $f_1$, and may vary throughout the espresso brewing process. During the espresso brewing process, $f_1$ may depend upon at least one of pressure provided by pump 526 ($P_0$), transverse diameter of first flow path 550 ($d_1$), adjustment of needle valve 546, transverse diameter of second flow path 552 ($d_2$), and whether solenoid valve 548 is open or closed. In some embodiments, fi may depend upon at least $d_0$, the diameter of giggleur 525.

The flow rate through second flow path 552 may be denoted by $f_2$, and may vary throughout the espresso brewing process. During the espresso brewing process, $f_2$ may depend upon at least one of pressure provided by pump 526 ($P_0$), transverse diameter of first flow path 550 ($d_1$), adjustment of needle valve 546, transverse diameter of second flow path 552 ($d_2$), and whether solenoid valve 548 is open or closed. In some embodiments, $f_2$ may dependent upon at least $d_0$, the diameter of giggleur 525. In at least one embodiment, $f_2$ may be equal to zero during at least a portion of the espresso brewing process. In at least one embodiment, $f_2$ may be equal to zero during at least a portion of the pre-brew phase.

In at least one embodiment, the flow rate of water into brew flow rate regulating assembly 536 may equal the flow rate out of brew flow rate regulating assembly 536, and may be equal to f In some embodiments, f may depend upon at least $f_1$ and $f_2$. In some embodiments, f may depend upon at least a sum off and $f_2$. During an espresso brewing process, f may depend upon at least one of pressure provided by pump 526 ($P_0$), transverse diameter of first flow path 550 ($d_1$), adjustment of needle valve 546, transverse diameter of second flow path 552 ($d_2$), and whether solenoid valve 548 is open or closed. In some embodiments, f may depend upon at least $d_0$, the transverse diameter of giggleur 525.

In some embodiments, espresso machine 500 may include brew pressure gauge 518. Brew pressure gauge 518 may indicate the pressure, P, between giggleur 525 and coffee grounds housing 520. In some embodiments, P may vary during the espresso brewing process. During an espresso brewing process, P may depend upon f In at least one embodiment, P may depend upon at least one of pressure provided by pump 526 ($P_0$), transverse diameter of first flow path 550 ($d_1$), adjustment of needle valve 546, transverse diameter of second flow path 552 ($d_2$), and whether solenoid valve 548 is open or closed. In some embodiments, P may depend upon at least $d_0$, the diameter of giggleur 525. In some embodiments, f may depend upon at least $d_0$, the diameter of giggleur 525. In at least one embodiment, P may at least approximate the pressure if the water being delivered to the coffee grounds.

Figure 6:
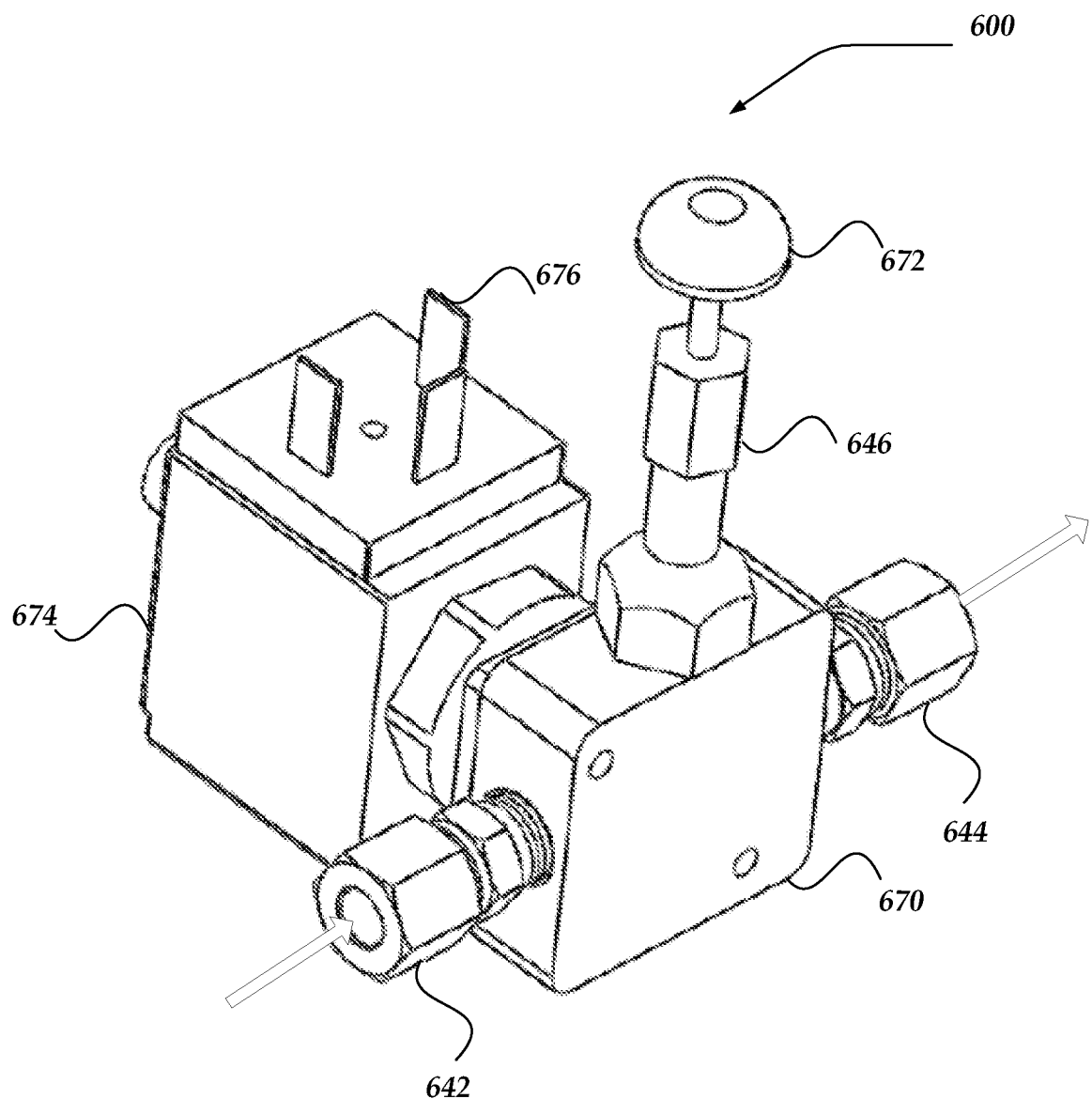
FIG. 6 illustrates schematically one embodiment of a brew flow rate regulation assembly, including a needle valve and a solenoid valve, according to the invention.

FIG. 6 illustrates one embodiment of brew flow rate regulation assembly 600, which includes brew regulation assembly input 642 and brew regulation assembly output 644. The arrows in FIG. 6 indicate the direction and magnitude of pressurized water flowing into and out of brew flow rate regulation assembly 600. In at least one embodiment, water flowing into brew regulation assembly input 642 may flow through at least a first flow path (not shown) in assembly block 670. Valve assembly 646 may regulate the flow rate of water through the first flow path in assembly block 670. In some embodiments, valve assembly 646 may be a needle valve assembly. In some embodiments, the flow rate of water through the first flow path may be regulated by at least adjusting needle valve adjustment knob 672. In some embodiments, needle valve adjustment knob 672 may be adjusted so that first flow path has an equivalent transverse diameter of $d_1$. In at least one embodiment, needle valve adjustment knob 672 may be adjusted prior to an espresso brewing process.

In at least one embodiment, assembly block 670 may include a second flow path (not shown). In some embodiments, the second flow path may have an equivalent transverse diameter of $d_2$. In some embodiments, $d_2$ may be greater than $d_1$. In some embodiments, the second flow path may be a by-pass of the first flow path. In some embodiments, another valve may regulate the flow rate through the second flow path. In at least one embodiment, the other valve may be an electromechanical valve, such as a solenoid valve. When the solenoid valve is open, at least a portion of the water flowing into brew regulation assembly input 642 may flow through the second flow path. When the solenoid valve is closed, water may be prevented from flowing through the second flow path.

Solenoid valve may include solenoid housing 674, which may house a solenoid employed to provide the mechanical force required to open and close the solenoid valve. Solenoid valve may include at least one solenoid valve electrical input 676, which may provide the electrical power required to energize the solenoid housed in solenoid housing 674. In some embodiments, solenoid valve may include a plurality of solenoid valve electrical inputs 676, one of which may include a line to ground. Another electrical input may carry an electrical signal to trigger the opening and closing of the solenoid valve.

In at least one of the various embodiments, the first flow path may be substantially perpendicular to the second flow path. In some embodiments, the needle valve regulating flow though the first flow path may be substantially perpendicular to the solenoid valve regulating flow rate through the second flow path. In at least one of the various embodiments, the first flow path may be substantially parallel to the second flow path. In some embodiments, the needle valve may be substantially parallel to the solenoid valve. In at least one embodiment, a first plunger included in the needle valve may be substantially perpendicular to a second plunger included in the solenoid valve.

Figure 7:
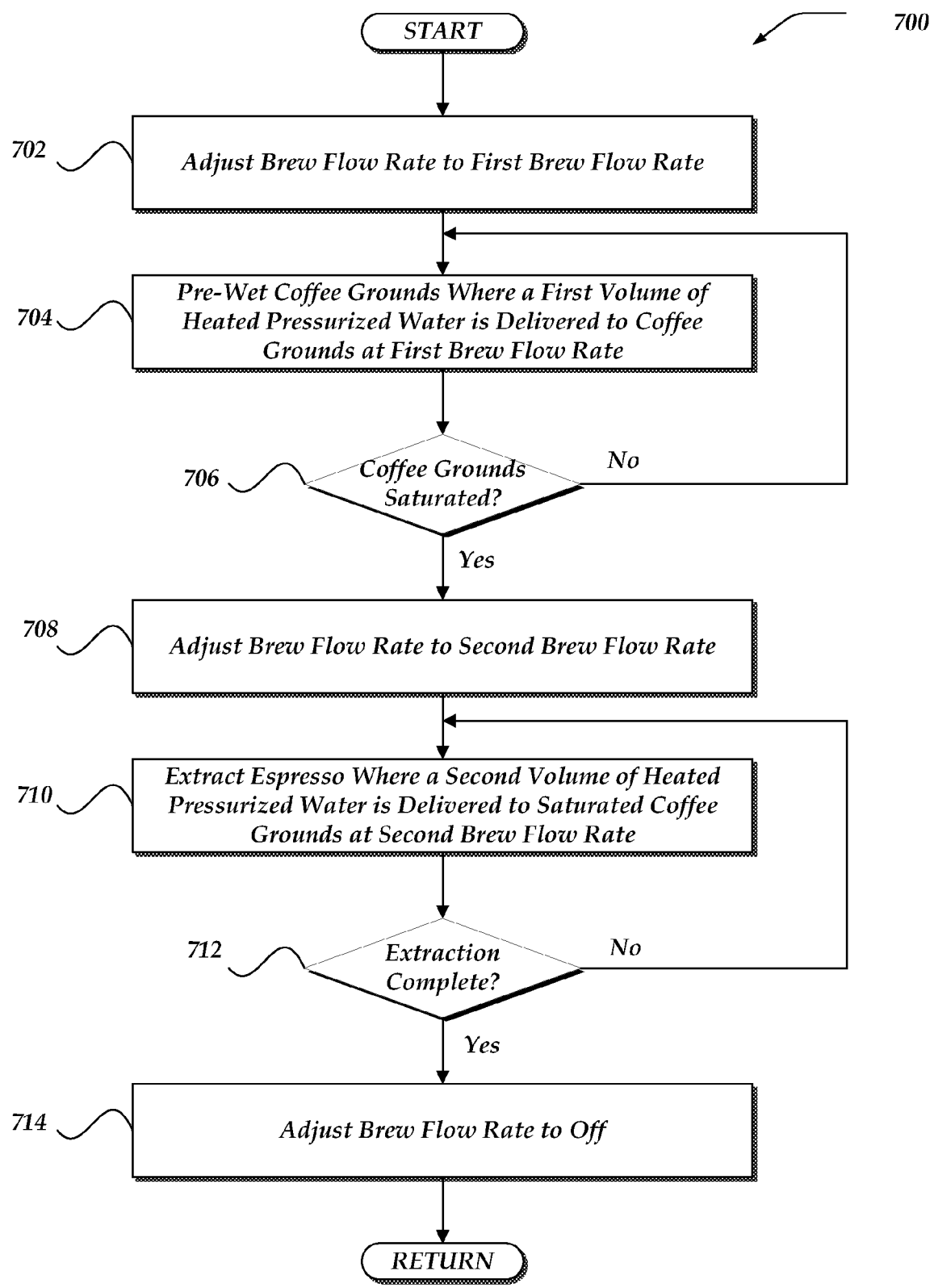
FIG. 7 illustrates a logical flow diagram showing one embodiment of an espresso brewing process that includes regulating a brew flow rate with an espresso machine, according to the invention.

FIG. 7 illustrates a logical flow diagram generally showing one embodiment of an espresso brewing process 700 that includes regulating a brew flow rate with an espresso machine, such as espresso machine 200 of FIG. 2. In at least one embodiment, espresso brewing process 700 includes at least two phases: a pre-brew phase and an extraction phase. In some embodiments, the pre-brew phase occurs prior to the extraction phase. During the pre-brew phase, coffee grounds that are used to brew espresso may be pre-wetted with heated water. In at least one embodiment, during the pre-brew phase, a first volume of water may be delivered to the coffee grounds, by the espresso machine, where a brew flow rate may be equal to a first brew flow rate. In at least one embodiment, the first volume of water delivered to the coffee grounds during the pre-brew phase may be significant enough to saturate the coffee grounds. In some of the various embodiments, the first volume of water delivered to the coffee grounds during the pre-brew phase, may induce an out-gassing reaction within the coffee grounds.

In some of the various embodiments, after the coffee grounds have been pre-wetted and/or out gassed, espresso brewing process 700 may transition to the extraction phase. In at least one of the various embodiments, during the extraction phase, the espresso machine may deliver a second volume of water to the pre-wetted coffee grounds at a brew flow rate equal to a second brew flow rate. The second volume of water delivered to the coffee grounds during the extraction phase, and at the second brew flow rate, may be extracted through the pre-wetted coffee grounds to produce brewed espresso from the out-gassed coffee grounds. In at least one of the various embodiments, the second brew flow rate may be greater than or equal to the first brew flow rate.

In at least one embodiment, the first volume of water delivered to the coffee grounds may be heated water. In at least one embodiment, the first volume of water delivered to the coffee grounds may be pressurized water. In at least one embodiment, the second volume of water delivered to the coffee grounds may be heated water. In at least one embodiment, the second volume of water delivered to the coffee grounds may be pressurized water.

In some embodiments, the pressure (P) between a giggleur, such as giggleur 525 of FIG. 5, and the coffee grounds housed in coffee ground housing, such as coffee ground housing 520 of FIG. 5, may vary during espresso brewing process 700. In some embodiments, P may be varied by at least varying the flow rate of water delivered to the espresso grounds. In some embodiments, P may be varied by at least varying the pressure $P_0$ delivered by a pump, such as pump 526 of FIG. 5. In some embodiments, P may be a function of time, such as P(t), during espresso brewing process 700. In at least one of the various embodiments, P may be a function of the volume of water that flows to the coffee grounds. For instance, a first volume delivered at a first flow rate may brew at an average first pressure. After delivering the first volume, the flow rate is adjusted to a second flow rate; the average pressure may transition to a second average pressure. During the extraction phase, the flow rate may be adjusted to a third flow rate, during the remainder of the extraction, which may result in a third average pressure during the remainder of the extraction. In at least some of the various embodiments, controlling and the timing of the adjustment of flow rate, volume of water delivered, pressure, pump speed, and the like may be manually controlled by a barista and/or automatically adjusted by processor device included in the espresso machine. In some embodiments, a measurement of the volume of water delivered to the coffee grounds may be enabled by at least a flow meter. In at least one of the various embodiments, a measurement of the flow rate may be enabled by at least the flow meter. In at least one embodiment, the first volume of water may be within a first window, such as 0-7 milliliters (ml). In at least one embodiment, the second volume of water may be within a second window, such as 7-15 ml. In another embodiment, the second volume of water may be within a volume range between 7 and 45 ml.

Figure 8:
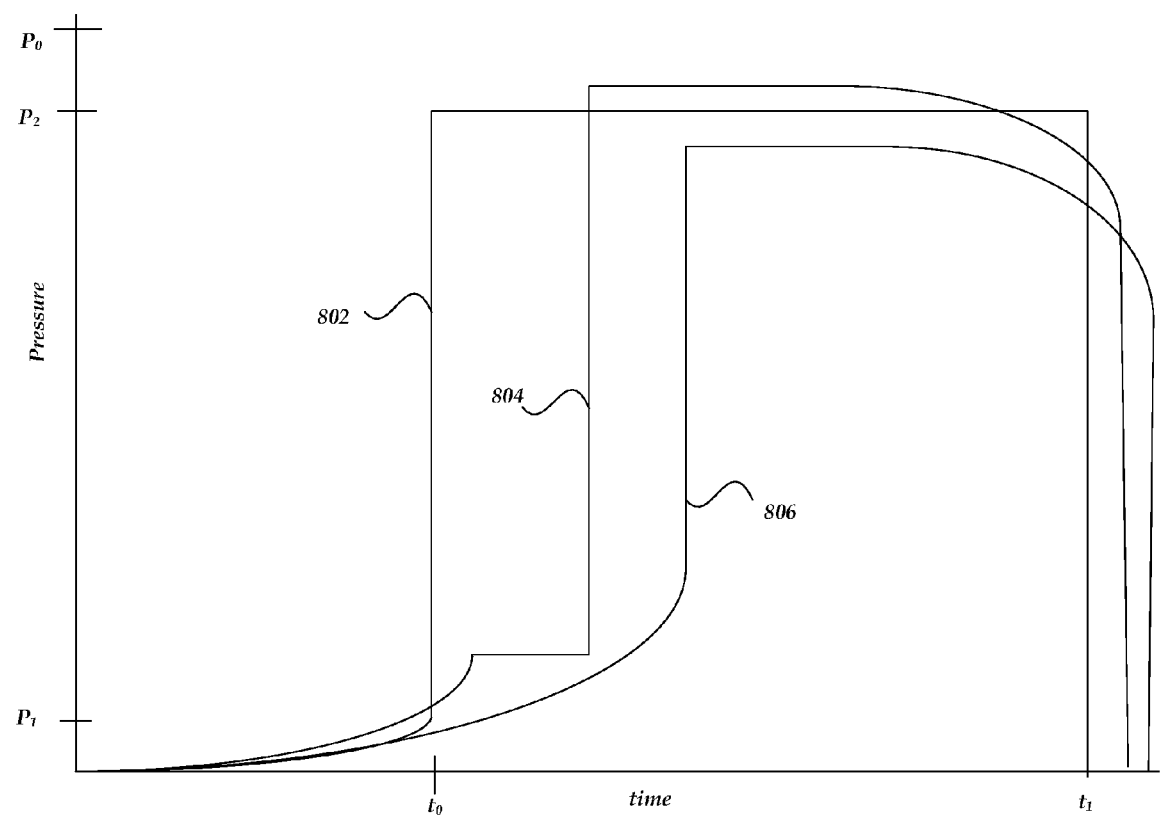
FIG. 8 schematically illustrates example pressure profiles resulting from an espresso brewing process, according to the invention.

FIG. 8 illustrates three examples of P as a function of time, or pressure profiles, resulting from various embodiments of espresso brewing process 700. The examples of the pressure profiles are discussed in the context of espresso brewing process 700. By varying the nature and shape of the pressure profile resulting from espresso brewing process 700, one may vary the taste of extracted shot of espresso. One may vary at least the nature and/or shape of the pressure profile by regulating the brew flow rate during the espresso brew process

700. In some embodiments, one may vary at least the nature and/or shape of the pressure profile by varying the flow rate, pressure, and total volume of the first volume of water delivered to the coffee grounds during the espresso brew process 700. In some embodiments, one may vary at least the nature and/or shape of the pressure profile by varying the flow rate, pressure, and total volume of the second volume of water delivered to the coffee grounds during the espresso brew process 700.

Process 700 begins, after a start block, at block 702 where a brew flow rate is adjusted to a first brew flow rate. In at least one embodiment, the adjusted brew flow rate refers to the rate that the espresso machine delivers heated pressurized water to coffee grounds that are used to brew espresso. In at least one embodiment, the brew flow rate is adjusted by employing at least a brew flow rate regulating assembly, such as brew flow rate regulating assembly 536 of FIG. 5. In some of the various embodiments, the brew flow rate regulating assembly may be controlled by controls for brew flow rate regulating assembly, such as controls for brew flow rate regulating assembly 508 of FIG. 5. In some embodiments, controls for brew flow rate regulating assembly may include at least a brew handle, such as brew handle 108 of FIG. 1. In at least one embodiment, a user of the espresso machine is enabled to adjust the brew flow rate of the espresso machine by adjusting a position of the brew handle. Various detection means may be employed to determine the user adjusted position of the brew handle. Such detection means include, but are not limited to Hall sensors, rheostats, magnetic switches, optical switches, and the like.

In some of the various embodiments, the brew flow rate may be adjusted to the first brew flow rate by adjusting the position of the brew handle to a first position. In at least one embodiment, adjusting the brew flow rate to the first brew flow rate may include at least adjusting a first valve included in the brew flow rate regulating assembly. In at least one embodiment, adjusting the brew flow rate to the first brew flow rate may include at least adjusting a second valve included in the brew flow rate regulating assembly. In some embodiments, adjusting the brew flow rate to the first brew flow rate may include at least adjusting another valve included in the espresso machine. In at least one embodiment, adjusting the brew flow rate to the first brew flow rate may include at least opening or closing the other valve included in the espresso machine. In at least one embodiment, adjusting a valve may include at least one of opening the valve, closing the valve, or adjusting an aperture size on an aperture included in the valve.

In at least one embodiment, adjusting the brew flow rate to a first brew flow rate may include opening another valve, where the other valve enables water pressurized by a pump, such as pump 526 of FIG. 5, to flow into the brew flow rate regulating assembly. In at least one embodiment, prior to block 702, the other valve may be in a closed position.

In some of the various embodiments, the first brew flow rate may be limited by at least a first needle valve, such as needle valve 546 of FIG. 5, where the first needle valve was adjusted prior to block 702. In some embodiments, the pre-adjusted first needle valve may be included in the brew flow rate regulating assembly. In some embodiments, the adjusted first needle valve may be in an open position and adjusted to a first aperture size. The first needle valve may permit the flow, but regulate the flow rate, of water through a first flow path in the brew flow rate regulation assembly, such as first flow path 550 of FIG. 5.

In some of the various embodiments, the first brew flow rate may be limited by at least an electro-mechanical valve, such as a solenoid valve. In some embodiments, the solenoid valve, such as solenoid valve 548 of FIG. 5, may be included in the brew flow rate regulating assembly. In some of the embodiments, the solenoid valve may be in a closed position at block 702. The closed solenoid valve may prohibit the flow of water through a second flow path in the brew flow rate regulation assembly, such as second flow path 552 in FIG. 5. In some embodiments, the first brew flow rate may be dependent on at least the sum a flow rate through the first flow path and the flow rate through second flow path. In at least one embodiment, the first brew flow rate may be equal to at least the sum of a flow rate through the first flow path and another flow rate through the second flow path.

At block 704, the coffee grounds being used to brew espresso may be pre-wetted. The coffee grounds being used to brew espresso may be out-gassed grounds. In some embodiments, the coffee grounds may be housed within a coffee ground basket within a coffee ground housing, such as coffee ground housing 520 of FIG. 5. In at least one embodiment, the coffee ground housing may be included in a portafilter assembly, such as portafilter assembly 110 of FIG. 1. In at least one embodiment, the espresso machine delivers heated pressurized water to the coffee grounds, at the first brew flow rate, in order to pre-wet and/or out-gas the coffee grounds. In at least one embodiment, pre-wetting the coffee grounds, prior to brewing espresso with the coffee grounds, at least induces an out-gassing reaction within the coffee grounds.

Pressure profile 802 of FIG. 8 illustrates one example of the pressure, P, as a function of time during espresso brewing process 700. Similar plots may be constructed for the flow volume as a function of time during the brewing process 700. The pre-brew phase lasts from $t=0$ to approximately $t=t_0$. During this time, P may ramp up from zero to approximately a pressure value of $P_1$. In some embodiments, prior to espresso brewing process 700, the first needle valve may be adjusted to provide the first volume of water, where the first volume of water is sufficient to saturate the coffee grounds within a pre-determined time interval, such as $t_0$. In at least one embodiment, $t_0$ may depend upon the coarseness of the coffee grounds. In some embodiments, $t_0$ may vary between 1 and 30 seconds or more. In some embodiments, $t_0$ may be long enough to allow the delivered water to saturate the coffee grounds.

In at least one embodiment, pressure P may be limited to a value of $P_1$, during the pre-brew phase, at least because the solenoid valve is closed during the pre-brew phase and accordingly, water is not flowing through the second flow path. In at least one embodiment, pressure P may be limited to a value of $P_1$, during the pre-brew phase, at least because a diameter of the giggleur is greater than the diameter of the needle valve within the brew flow rate regulation assembly. In at least one embodiment, pressure value $P_1$ may not be great enough to force the delivered water through the coffee grounds. In some embodiments, the choice of $t_0$, $P_1$, the volume of the first volume of water delivers, and other brewing parameters may greatly affect the taste of the brewed espresso.

Pressure profile 804 and 806 show two other examples of pressure as a function of time that may be achieved by some embodiments, by varying the flow rate, the volumes of the first volume and second volumes, and/or pressure provided by the pump during espresso brewing process 700, and the durations for which at least the pre-brew phase and the extraction phase last. The shape of the pressure curve during the pre-brew phase may greatly affect the taste and texture of the brewed espresso. In both pressure profiles 804 and 806, the pre-brew phase of espresso brewing process 700 lasts longer than $t_0$. Note, the transition to the extraction phase may be signaled by at least a discontinuity in the pressure as a function of time curve. In some embodiments, the transition to the extraction phase may be signaled by at least an increase in the first derivative of the pressure as a function of time curve.

The heated pressurized water may be delivered, at the first brew flow rate, to the coffee grounds, until at decision block 706, it is determined that the coffee grounds have become saturated with the delivered water. In some embodiments, an indication that the coffee grounds have become saturated includes at least a portion of the first volume of water delivered at the first brew flow rate begins to flow out of an espresso output, such as espresso output 540 of FIG. 5. In some embodiments, the espresso machine may include a mirror to observe when water begins to flow out of the espresso output. In some embodiments, the espresso output may be an aperture in the portafilter assembly. When it has been determined that the coffee grounds have been saturated, or to otherwise terminate the pre-brew phase, process 700 may flow to block 708. In at least one embodiment, the pre-brew phase may be associated with at least pre-wetting the coffee grounds at the first brew flow rate. In at least one embodiment, the pre-brew phase may be associated with at least one of the first brew flow rate. In some embodiments, the pre-brew phase may be terminated at block 706 and the process 700 may proceed to block 708.

In alternative embodiments, the brew flow rate may be adjusted to a third flow rate before proceeding to block 708. In some of the various embodiments, the brew flow rate may be adjusted to the third brew flow rate by adjusting the position of the brew handle to a third position. In at least one embodiment, the third position of the brew handle may be an off position. In some embodiments, the third flow rate may be equal to an off value. In such a case, the flow of water through the espresso machine may be halted and the brewing process may wait a duration before proceeding to block 708. Accordingly, in some embodiments, a duration may occur after the pre-brew phase is terminated, but before the brewing process transitions to the extraction phase. During the duration, an out-gassing reaction may be occurring in the coffee grounds. After the duration, process 700 may proceed to block 708.

Pressure profile 804 illustrates a duration, after the pre-brew phase, but prior to the extraction phase. In at least embodiment, the slope, or first time derivative, of the pressure curve may approximate a value close to zero during a duration phase. The increase in the slope of pressure profiles 802, 804, and 806 may signify a transition to the extraction phase.

At block 708, the brew flow rate may be adjusted to a second brew flow rate. In some of the various embodiments, the brew flow rate may be adjusted to the second brew flow rate by adjusting the position of the brew handle to a second position. In some embodiments, the second brew flow rate may be greater than the first flow rate. In at least one embodiment, adjusting the brew flow rate to the second brew flow rate may include at least adjusting a first valve included in the brew flow rate regulating assembly. In at least one embodiment, adjusting the brew flow rate to the second brew flow rate may include at least adjusting a second valve included in the brew flow rate regulating assembly. In some embodiments, adjusting the brew flow rate to the second brew flow rate may include at least adjusting another valve included in the espresso machine.

In some of the various embodiments, the second brew flow rate may be limited by at least the first needle valve. In some of the various embodiments, the second brew flow rate may be limited by at least the solenoid valve. In some of the embodiments, the solenoid valve may be in an open position at block 708. In some embodiments, the solenoid valve may be adjusted or transitioned from a closed position to an open position at block 708. The open solenoid valve may allow for the flow of water through the second flow path in the brew flow rate regulation assembly. In some embodiments, the second brew flow rate may be at least the sum a flow rate through the first needle valve and the solenoid valve.

In at least embodiment, increasing the flow rate from the first brew flow rate to the second brew flow rate may increase the pressure, P. Pressure profile 802 of FIG. 8 demonstrates, that at $t_0$, where espresso brewing process 700 transitions from the pre-brew phase to the extraction phase, the pressure increases from value of $P_1$ to an increased value of $P_2$. In some embodiments, this transition may resemble a step function. In other embodiments, the transition in pressure may be continuous and/or may occur more gradually. Pressure profiles 804 and 806 also demonstrate a step function indicating where espresso brew process has transitioned to the extraction phase.

In at least one embodiment, the transition of pressure at $t_0$ may occur at least because the solenoid valve may have transitioned from a closed state to an open state. In at least one embodiment, water may now flow through at least the second flow path. In some embodiments, the diameter of the giggleur may be less than the diameter of the second flow path. In some embodiments, the diameter of the giggleur may be less than the sum of the diameter of the second flow path and the diameter of the first needle valve. In some embodiments, $P_1$ may be less than $P_0$, the pressure supplied by the pump. In some embodiments, $P_1$ may be approximately equal to $P_0$. In at least some embodiments, $P_1$ may be great enough to force the water delivered to the espresso grounds through the espresso grounds to produce espresso.

At block 710, a second volume of heated pressurized water may be delivered to the pre-wetted coffee grounds at the second brew flow rate. In at least one embodiment, the pre-wetted grounds may be saturated grounds. In some embodiments, at least a portion of the second volume of heated pressurized water delivered to the coffee grounds at block 710 may be extracted through the coffee grounds to produce espresso. The produced espresso may flow out of the espresso machine through the espresso output. Extraction of espresso may continue, until it is determined that the extraction is complete at decision block 712. In at least one embodiment, the extraction phase may be associated with at least extracting the heated pressurized water through the pre-wetted coffee grounds, where the second volume of water has been delivered to the pre-wetted coffee grounds at the second brew flow rate. In at least one embodiment, the extraction phase may be associated with at least one of the second brew flow rate.

In some embodiments, the pressure profile may remain at an approximately constant pressure during the extraction phase. For instance, pressure profile 802 illustrates that the pressure remains constant at $P_1$ pressure value during until the extraction phase is terminated at $t_1$. According, the extraction phase may last for a finite duration, such as $t_1 - t_0$. In alternative embodiments, the pressure profile may vary during the extraction phase. For instance, both pressure profiles 804 and 806 illustrate the pressure rolling off, or decreasing, before espresso brewing process 700 is terminated. In at least on embodiment, this rolling off may be enabled by at least varying the second flow rate during the extraction phase. In at least some embodiments, varying the pressure may be enabled by at least varying the pump supplied pressure, $P_0$. Some embodiments may vary a rotational speed of the pump during espresso brewing process 700. The shape and duration of the extraction phase may greatly affect the taste of the produces espresso.

In some embodiments, the first volume of water delivered to the coffee grounds, at the first flow rate, during the pre-brew phase may be less than or equal to the second volume of water delivered to the coffee grounds, at the second flow rate, during the extraction phase. In at least one alternative embodiment, the first volume of water delivered to the coffee grounds, at the first flow rate, during the pre-brew phase may be greater than the second volume of water delivered to the coffee grounds, at the second flow rate, during the extraction phase.

At block 714, the brew flow rate may be adjusted to an off value, to terminate espresso brewing process 700 and so that water does not flow through the espresso machine, after the espresso shot has been brewed. In at least one embodiment, process 700 may transition to block 714 at time $t_1$. In some of the various embodiments, the brew flow rate may be adjusted to the off value by adjusting the position of the brew handle to a third position or to an off position. In at least one embodiment, adjusting the brew flow rate to the off value may include at least adjusting a first valve included in the brew flow rate regulating assembly. In at least one embodiment, adjusting the brew flow rate to the off value may include at least adjusting a second valve included in the brew flow rate regulating assembly. In some embodiments, adjusting the brew flow rate to the off value may include at least adjusting another valve included in the espresso machine.

Figure 9:
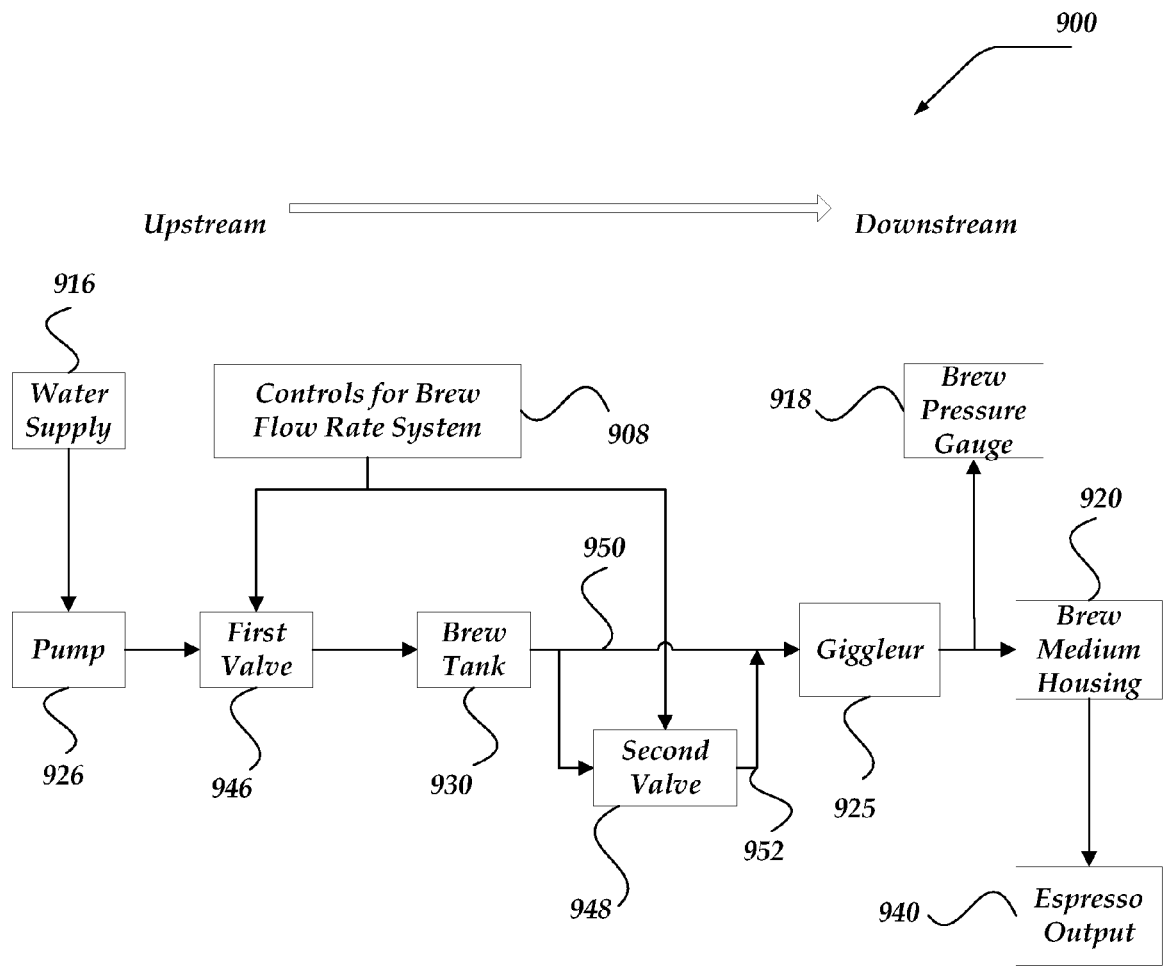
FIG. 9 schematically illustrates another embodiment of a pump-driven espresso machine that is enabled to regulate a flow rate of water during an espresso brewing process, according to the invention.

FIG. 9 schematically illustrates an embodiment of a pump-driven espresso machine 900 that is enabled to regulate a flow rate of water during an espresso brewing process, according to the invention. Espresso machine 900 includes water supply 916, pump 926, brew tank 930, giggleur 925, brew pressure gauge 918, brew medium housing 920, espresso output 940, and other components. Various components included in espresso machine 900 may be included in a brew flow rate regulating system. For example, at least one of the first valve 946 or the second valve 948 may be included in a brew flow rate system. Espresso machine 900 includes various controls 908 for the brew flow rate system. At least some of the components of the brew flow rate system may be integrated in an assembly, such as brew flow rate regulating assembly 536 of espresso machine 500 of FIG. 5, but need not be.

Espresso machine 900 may be similar to espresso machine 500 of FIG. 5 in some respects. However, in other respects, espresso machines 500 and 900 differ. For instance, the relative configuration and positioning of first valve 946 and second valve 948 of espresso machine 900 differs from the corresponding first valve 546 and second valve 548 of espresso machine 500. As with first path 550 and second path 552 of espresso machine 500, the first path 950 and the second path 952 of espresso machine 900 are parallel paths. However, the parallel structure of first path 950 and second path 952 can be positioned anywhere between pump 926 and brew medium housing 920. Likewise, the first valve 946 and the second valve 948 can be positioned anywhere along the brew stream.

For instance, in espresso machine 500, the first flow path 550, the second flow path 552, the first valve 546, and the second valve 548 are all positioned between pump 526 and the brew tank 530. However, in espresso machine 900, the second flow path and the second valve 948 are positioned between the brew tank 930 and the giggleur 925. Other positioning of either the first flow path 950, the second flow path 952, the first valve 946, and the second valve 948 are of course possible. Likewise, the brew flow rate regulating assembly 536 of espresso machine 500 may be positioned anywhere along the brew stream between pump 526 and coffee ground housing 520. Furthermore, for any of the embodiments described herein, it should be understood that the nomenclature may be inverted such that the terminology of first/second valves and first/second flow paths are interchangeable. In some embodiments, first valve 946 is absent from espresso machine 900, or always in a fully or partially open position, such that the opening and closing of second valve 948 regulates the brew flow rate.

Figure 10:
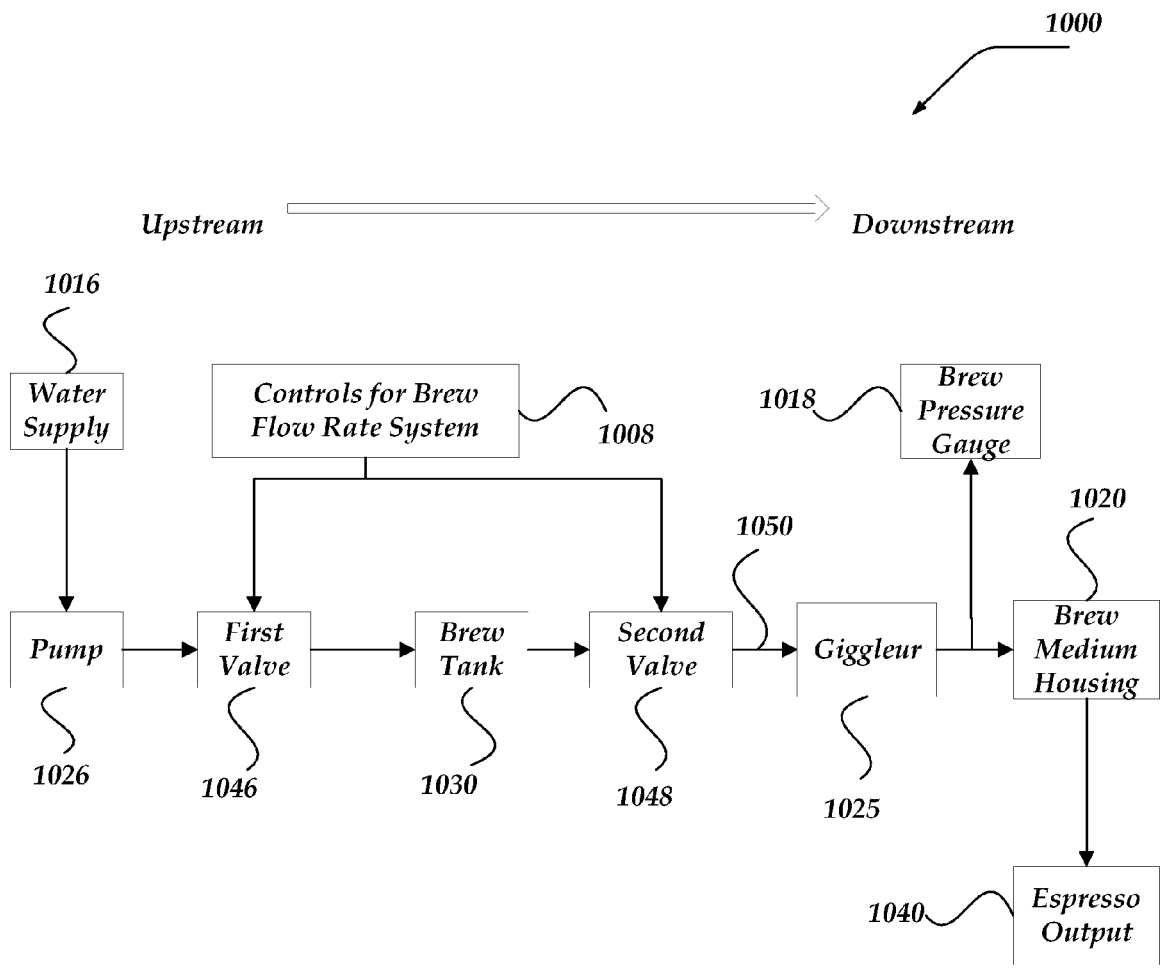
FIG. 10 schematically illustrates another embodiment of a pump-driven espresso machine that is enabled to regulate a flow rate of water during an espresso brewing process, according to the invention.

FIG. 10 schematically illustrates another embodiment of a pump-driven espresso machine 1000 that is enabled to regulate a flow rate of water during an espresso brewing process, according to the invention. Espresso machine 1000 includes similar components to espresso machine 500 of FIG. 5 and espresso machine 900 of FIG. 9. For instance, espresso machine 1000 includes a water supply 1016, a pump 1026, brew pressure gauge 1018, controls for brew flow rate system 1006, giggleur 1025, and the like.

However, espresso machine 1000 regulates the brew flow rate along a first path 1050, by employing one or more valves, such as first valve 1046 or second valve 1048. Thus, espresso machine 1000 regulates the brew flow rate along a serial flow path configuration, rather than a parallel flow rate configuration. Accordingly, the first valve 1046 and the second valve 1048 may be serial or parallel valves. Furthermore, in either a serial or a parallel flow rate regulation configuration, only one of the valves is needed, but two or more valves may be employed to provide greater control and accuracy of the regulation of the brew flow rate. In addition, in a parallel flow rate regulation configuration, more than two parallel flow paths may be employed. For instance, FIG. 4 shows three parallel flow paths 450, 452, and 452. Of course, more than three parallel flow paths may be constructed in any of the embodiments included herein.

The above specification, examples, and data provide a description of the composition, manufacture, and use of the invention. Since many embodiments of the invention can be made without departing from the spirit and scope of the invention, the invention resides in the claims hereinafter appended.

The embodiments of the invention in which an exclusive property or privilege is claimed are defined as follows:

1. A method for brewing a beverage by employing a beverage brewing machine, the method comprising:
adjusting a brew flow rate of fluid within the machine to a first flow rate, including:
providing a first fluid-flow path of the machine for the first volume of fluid to flow through;
pumping a first volume of fluid through an output aperture of the machine at the first flow rate to provide at least a portion of the first volume of fluid to a brewing medium to pre-wet the brewing medium;
adjusting the brew flow rate of the fluid to a second flow rate, including:
providing the first fluid-flow path and a second fluid-flow path of the machine for the second volume of fluid to flow through, wherein the second flow rate is greater than the first flow rate;
pumping a second volume of the fluid through the output aperture at the second flow rate to provide at least a portion of the second volume of fluid to the pre-wetted brewing medium; and
extracting at least a portion of the delivered second volume of fluid through the pre-wetted brewing medium to produce the brewed beverage.

2. The method of claim 1, wherein adjusting the brew flow rate to the second flow rate further includes at least partially opening a valve positioned in the second fluid-flow path of the machine.

3. The method of claim 1, wherein when the first volume of fluid is pumped through the output aperture, a valve positioned in the second fluid-flow path of the machine is at least partially restricting the second fluid-flow path of the machine.

4. The method of claim 1, wherein an average fluid pressure associated with the portion of the second volume of fluid that is provided to the pre-wetted brewing medium is greater than a corresponding average fluid pressure associated with the portion of the first volume of fluid that is provided to the brewing medium to pre-wet the brewing medium.

5. The method of claim 1, wherein adjusting the brew flow rate to the second flow rate further includes increasing a cross section of at least one of the first or the second fluid-flow paths for the second volume of fluid to flow through.

6. A method for brewing a beverage by employing a beverage brewing machine, the method comprising:
  adjusting a brew flow rate of fluid within the machine to a first flow rate, including:
    providing a fluid-flow path of the machine for the first volume of fluid to flow through;
  pumping a first volume of fluid through an output aperture of the machine at the first flow rate to provide at least a portion of the first volume of fluid to a brewing medium to pre-wet the brewing medium;
  adjusting the brew flow rate of the fluid to a second flow rate, including:
    increasing a cross section of the fluid-flow path for the second volume of fluid to flow through, wherein the second flow rate is greater than the first flow rate;
  pumping a second volume of the fluid through the output aperture at the second flow rate to provide at least a portion of the second volume of fluid to the pre-wetted brewing medium; and
  extracting at least a portion of the delivered second volume of fluid through the pre-wetted brewing medium to produce the brewed beverage.

7. The method of claim 6, wherein adjusting the brew flow rate to the second flow rate further includes at least partially opening a valve positioned in the fluid-flow path of the machine.

8. The method of claim 6, wherein when the first volume of fluid is pumped through the output aperture, a valve positioned in the fluid-flow path of the machine is at least partially restricting the fluid-flow path of the machine.

9. The method of claim 6, wherein an average fluid pressure associated with the portion of the second volume of fluid that is provided to the pre-wetted brewing medium is greater than a corresponding average fluid pressure associated with the portion of the first volume of fluid that is provided to the brewing medium to pre-wet the brewing medium.

10. The method of claim 6, wherein adjusting the brew flow rate to the second flow rate further includes providing the fluid-flow path and a second fluid-flow path for the second volume of fluid to flow through.

* * * * *